United States Patent
Tang et al.

(10) Patent No.: US 12,380,680 B2
(45) Date of Patent: Aug. 5, 2025

(54) MODEL TRAINING METHOD AND RELATED DEVICE

(71) Applicant: HUAWEI TECHNOLOGIES CO., LTD., Guangdong (CN)

(72) Inventors: Fuhui Tang, Shenzhen (CN); Xiaopeng Zhang, Shanghai (CN); Minzhe Niu, Shanghai (CN); Zichen Wang, Shanghai (CN); Jianhua Han, Shanghai (CN); Qi Tian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 485 days.

(21) Appl. No.: 17/986,081

(22) Filed: Nov. 14, 2022

(65) Prior Publication Data
US 2023/0075836 A1    Mar. 9, 2023

Related U.S. Application Data

(63) Continuation of application No. PCT/CN2021/088787, filed on Apr. 21, 2021.

(30) Foreign Application Priority Data

May 15, 2020   (CN) .......................... 202010412910.6

(51) Int. Cl.
*G06V 10/774*   (2022.01)
*G06V 10/30*   (2022.01)
(Continued)

(52) U.S. Cl.
CPC .......... *G06V 10/774* (2022.01); *G06V 10/30* (2022.01); *G06V 10/40* (2022.01); *G06V 10/764* (2022.01); *G06V 10/82* (2022.01)

(58) Field of Classification Search
CPC ...... G06V 10/774; G06V 10/40; G06V 10/82; G06V 10/30; G06V 10/764
See application file for complete search history.

(56) References Cited

U.S. PATENT DOCUMENTS

| | | | |
|---|---|---|---|
| 11,244,671 B2 * | 2/2022 | Kim ....................... | G10L 15/063 |
| 2018/0268292 A1 * | 9/2018 | Choi .................... | G06V 10/454 |

(Continued)

FOREIGN PATENT DOCUMENTS

| | | |
|---|---|---|
| CN | 108921294 A | 11/2018 |
| CN | 109871905 A | 6/2019 |

(Continued)

OTHER PUBLICATIONS

Zhu, Yousong, et al. "Mask guided knowledge distillation for single shot detector." 2019 IEEE international conference on multimedia and expo (ICME). IEEE, 2019. (Year: 2019).*

(Continued)

*Primary Examiner* — Utpal D Shah

(57) ABSTRACT

A model training method and a related apparatus are provided and may be used in computer vision to perform image detection. The method includes: extracting feature information from a target image; further separately extracting features of a target object from the feature information by using a Gaussian mask to obtain a first local feature and a second local feature; determining a feature loss by using the first local feature and the second local feature; performing prediction by using the first network and the second network based on a same region proposal set to obtain a first classification predicted value and a second classification predicted value, and obtaining a classification loss based on the first classification predicted value and the second clas- (Continued)

sification predicted value; and training the second network based on the classification loss and the feature loss to obtain a target network.

19 Claims, 12 Drawing Sheets

(51) Int. Cl.
*G06V 10/40* (2022.01)
*G06V 10/764* (2022.01)
*G06V 10/82* (2022.01)

(56) References Cited

U.S. PATENT DOCUMENTS

| | | | | |
|---|---|---|---|---|
| 2018/0365564 | A1* | 12/2018 | Huang | G06N 3/045 |
| 2020/0302230 | A1* | 9/2020 | Chang | G06F 18/214 |
| 2021/0407090 | A1* | 12/2021 | Li | G06F 18/24 |
| 2022/0156593 | A1* | 5/2022 | Liu | G06F 18/2155 |
| 2022/0180199 | A1* | 6/2022 | Xu | G06N 3/08 |

FOREIGN PATENT DOCUMENTS

| | | |
|---|---|---|
| CN | 109961442 A | 7/2019 |
| CN | 110163344 A | 8/2019 |
| CN | 110472730 A | 11/2019 |

OTHER PUBLICATIONS

Hao, Yu, et al. "An end-to-end architecture for class-incremental object detection with knowledge distillation." 2019 IEEE International Conference on Multimedia and Expo (ICME). IEEE, 2019. (Year: 2019).*

Chen, Guobin, et al. "Learning efficient object detection models with knowledge distillation." Advances in neural information processing systems 30 (2017). (Year: 2017).*

Rui Chen et al., "Learning Lightweight Pedestrian Detector With Hierarchical Knowledge Distillation", arXiv:1909.09325v1, Sep. 20, 2019, total 5 pages.

Ze Yang et al., "Model Compression with Two-stage Multi-teacher Knowledge Distillation for Web Question Answering System", arXiv:1910.08381v1, Oct. 18, 2019, total 9 pages.

Office Action issued in CN202010412910.6, dated Jul. 24, 2024, 9 pages.

Tao Wang et al.,"Distilling Object Detectors with Fine-grained Feature Imitation", Publish Year: 2019, total: 10 pages.

Guohin Chen et al., "Learning Efficient Object Detection Models with Knowledge Distillation", 31st Conference on Neural Information Processing Systems (NIPS 2017), Long Beach, CA, USA, total: 10 pages.

Xuemeng Song et al., "Neural Compatibility Modeling with Attentive Knowledge Distillation", SIGIR"18, Jul. 8-12, 2018, Ann Arbor, MI, USA, total: 10 pages.

Ruichi Yu et al.,"Visual Relationship Detection with Internal and External Linguistic Knowledge Distillation", Jul. 28, 2017, total: 9 pages.

Adriana Romero et al., "FITNETs: Hints for Thin Deep Nets", Published as a conference paper at ICLR 2015, total: 13 pages.

Geoffrey Hinton et al., "Distilling the Knowledge in a Neural Network", Mar. 9, 2015, total: 9 pages.

International Search Report and Written Opinion issued in PCT/CN2021/088787, dated Jun. 24, 2021, 11 pages.

\* cited by examiner

MODEL TRAINING METHOD AND RELATED DEVICE

CROSS-REFERENCE TO RELATED APPLICATIONS

This application is a continuation of International Application No. PCT/CN2021/088787, filed on Apr. 21, 2021, which claims priority to Chinese Patent Application No. 202010412910.6, filed on May 15, 2020. The disclosures of the aforementioned applications are hereby incorporated by reference in their entireties.

TECHNICAL FIELD

This application relates to the image processing field, and in particular, to a model training method and a related device.

BACKGROUND

Target detection refers to classifying and locating a target object in an image. As shown in FIG. 1, an umbrella 11 or a person 12 in the image may be classified and located through target detection. Target detection performed on an image is widely applied, for example, autonomous driving, a smart city, a mobile phone terminal, and the like. Therefore, there are high requirements on detection precision and a detection speed. Target detection performed on an image is usually implemented by using a neural network. However, although detection precision of a large neural network is high, a detection speed is slow. Although a detection speed of a small neural network is fast, detection precision is low. How to train a neural network with a faster detection speed and a more accurate detection result is an ongoing technical problem studied by people skilled in the art.

SUMMARY

Embodiments of this application disclose a model training method and a related device, which may be used in fields such as artificial intelligence and computer vision to perform image detection. The method and the related device can improve network prediction efficiency and precision.

According to a first aspect, an embodiment of this application provides a model training method, where the method includes:
extracting first feature information in a target image by using a feature extraction layer of a first network;
extracting second feature information in the target image by using a feature extraction layer of a second network, where both the first network and the second network are classification networks, and a depth of the first network is greater than a depth of the second network;
extracting a feature that is in the first feature information and that is about a target object by using a Gaussian mask to obtain a first local feature;
extracting a feature that is in the second feature information and that is about the target object by using the Gaussian mask to obtain a second local feature;
determining a feature loss by using the first local feature and the second local feature; and
training the second network based on the feature loss to obtain a target network.

In the foregoing method, the Gaussian mask is used to highlight the local feature that is in the feature information extracted by the first network and that is about the target object, and highlight the local feature that is in the feature information extracted by the second network and that is about the target object. Then, the feature loss is determined based on the local features that are in the two networks and that are about the target object, and the second network is subsequently trained based on the feature loss. Background noise (including background noise outside a viewfinder frame of the target object and background noise inside the viewfinder frame of the target object) of the image is filtered out by using the Gaussian mask. The resulting feature loss can better reflect a difference between the second network and the first network. Therefore, training the second network based on the feature loss can enable expression of a feature by the second network to approximate expression of a feature by the first network, and model distillation effect is good.

With reference to the first aspect, in a first possible implementation of the first aspect, the method further includes:
generating a first classification predicted value of a target region proposal in a region proposal set by using a classification layer of the first network;
generating a second classification predicted value of the target region proposal in the region proposal set by using a classification layer of the second network;
determining a classification loss based on the first classification predicted value and the second classification predicted value; and
the training the second network based on the feature loss to obtain a target network includes:
training the second network based on the feature loss and the classification loss to obtain the target network.

In this possible implementation, the same region proposal set is selected, so that the classification layer of the first network and the classification layer of the second network generate the classification predicted values based on the same region proposal. When region proposals are the same, a difference between the predicted values generated by the two networks is usually caused by a difference between model parameters of the two networks. Therefore, in this embodiment, the classification loss used to train the second network is determined based on a difference between the first predicted value and the second predicted value. In this manner, a loss of the second network relative to the first network can be minimized. Therefore, training the second model based on the classification loss can enable a classification result of the second network to approximate a classification result of the first network, and the model distillation effect is good.

With reference to the first aspect or the first possible implementation of the first aspect, in a second possible implementation of the first aspect, the training the second network based on the feature loss to obtain a target network includes:
training the second network based on the feature loss; and
training the trained second network by using a third network to obtain the target network, where a depth of the third network is greater than the depth of the first network.

In this possible implementation, after the second network is trained by using the first network, the third network with more layers is further used to further train the trained second network, so that performance of the second network can be stably improved.

According to a second aspect, an embodiment of this application provides a model training method, where the method includes:

training a second network based on a first network to obtain an intermediate network; and training the intermediate network based on a third network to obtain a target network, where all the first network, the second network, and the third network are classification networks, a depth of the third network is greater than a depth of the first network, and the depth of the first network is greater than a depth of the second network.

In the foregoing method, after the second network is trained by using the first network, the third network with more layers is further used to further train the trained second network, so that performance of the second network can be stably improved.

With reference to the second aspect, in a first possible implementation of the second aspect, the training a second network based on a first network includes:

extracting first feature information in a target image by using a feature extraction layer of the first network;

extracting second feature information in the target image by using a feature extraction layer of the second network;

extracting a feature that is in the first feature information and that is about a target object by using a Gaussian mask to obtain a first local feature;

extracting a feature that is in the second feature information and that is about the target object by using the Gaussian mask to obtain a second local feature;

determining a feature loss by using the first local feature and the second local feature; and training the second network based on the feature loss to obtain the intermediate network.

In this possible implementation, the Gaussian mask is used to highlight the local feature that is in the feature information extracted by the first network and that is about the target object, and highlight the local feature that is in the feature information extracted by the second network and that is about the target object. Then, the feature loss is determined based on the local features that are in the two networks and that are about the target object, and the second network is subsequently trained based on the feature loss. Background noise (including background noise outside a viewfinder frame of the target object and background noise inside the viewfinder frame of the target object) of the image is filtered out by using the Gaussian mask. The resulting feature loss can better reflect a difference between the second network and the first network. Therefore, training the second network based on the feature loss can enable expression of a feature by the second network to approximate expression of a feature by the first network, and model distillation effect is good.

With reference to the first possible implementation of the second aspect, in a second possible implementation of the second aspect, the method further includes:

generating a first classification predicted value of a target region proposal in a region proposal set by using a classification layer of the first network;

generating a second classification predicted value of the target region proposal in the region proposal set by using a classification layer of the second network;

determining a classification loss based on the first classification predicted value and the second classification predicted value; and the training the second network based on the feature loss to obtain the intermediate network includes:

training the second network based on the feature loss and the classification loss to obtain the intermediate network.

In this possible implementation, the same region proposal set is selected, so that the classification layer of the first network and the classification layer of the second network generate the classification predicted values based on the same region proposal. When region proposals are the same, a difference between the predicted values generated by the two networks is usually caused by a difference between model parameters of the two networks. Therefore, in this embodiment, the classification loss used to train the second network is determined based on a difference between the first predicted value and the second predicted value. In this manner, a loss of the second network relative to the first network can be minimized. Therefore, training the second model based on the classification loss can enable a classification result of the second network to approximate a classification result of the first network, and the model distillation effect is good.

With reference to the first aspect, the second aspect, any possible implementation of the first aspect, or any possible implementation of the second aspect, in still another possible implementation, both the first network and the second network have the region proposal set by sharing a region proposal network (RPN) between the first network and the second network.

With reference to the first aspect, the second aspect, any possible implementation of the first aspect, or any possible implementation of the second aspect, in still another possible implementation, the RPN is shared by the second network with the first network, or is shared by the first network with the second network.

With reference to the first aspect, the second aspect, any possible implementation of the first aspect, or any possible implementation of the second aspect, in still another possible implementation, the target region proposal is all region proposals in the region proposal set, or is a positive region proposal that is in the region proposal set and that belongs to the target object.

With reference to the first aspect, the second aspect, any possible implementation of the first aspect, or any possible implementation of the second aspect, in still another possible implementation, the classification loss $L_{cls}$ satisfies the following relationship:

$$L_{cls} = \sum_{m=1}^{K} L_{CE}(y_s^m, y^m) + \beta \sum_{n=1}^{N_p} L_{BCE}(y_s^n, y_t^n).$$

K is a total quantity of region proposals in the region proposal set, $N_p$ is a total quantity of positive region proposals that are in the region proposal set and that belong to the target object, $y_s^m$ is a classification predicted value predicted by the classification layer of the second network for an $m^{th}$ region proposal in the region proposal set, $y^m$ is a ground truth label corresponding to the $m^{th}$ region proposal in the region proposal set, $y_s^n$ is the second classification predicted value predicted by the classification layer of the second network for an $n^{th}$ positive region proposal that is in the region proposal set and that belongs to the target object, $y_t^n$ is the first classification predicted value predicted by the classification layer of the first network for the $n^{th}$ positive region proposal that is in the region proposal set and that belongs to the target object, $L_{CE}(y_s^m, y^m)$ represents a cross entropy loss obtained based on $y_s^m$ and $y^m$, $L_{BCE}(y_s^n, y_t^n)$ represents a binary cross entropy loss obtained based on $y_s''$ and $y_t''$, and $\beta$ is a preset weight balance factor.

With reference to the first aspect, the second aspect, any possible implementation of the first aspect, or any possible implementation of the second aspect, in still another possible implementation, the method further includes:

determining a regression loss and an RPN loss of the second network based on a ground truth label of a region proposal in the target image and a predicted value predicted by the second network for the region proposal in the target image; and the training the second network based on the feature loss and the classification loss to obtain the target network includes:

training the second network based on the feature loss, the classification loss, the regression loss, and the RPN loss to obtain the target network.

With reference to the first aspect, the second aspect, any possible implementation of the first aspect, or any possible implementation of the second aspect, in still another possible implementation, after the training the second network based on the feature loss to obtain a target network, the method further includes:

sending the target network to a model using device, where the target network is used to predict content in an image.

According to a third aspect, an embodiment of this application provides an image detection method, where the method includes:

obtaining a target network, where the target network is a network obtained after a second network is trained by using a first network, a parameter used for training the second network by using the first network includes a feature loss, the feature loss is determined based on a first local feature and a second local feature, the first local feature is a feature that is extracted from first feature information by using a Gaussian mask and that is about a target object, the second local feature is a feature that is extracted from second feature information by using the Gaussian mask and that is about the target object, the first feature information is feature information that is extracted by using a feature extraction layer of the first network and that is in a target image, the second feature information is feature information that is extracted by using a feature extraction layer of the second network and that is in the target image, both the first network and the second network are classification networks, and a depth of the first network is greater than a depth of the second network; and recognizing content in an image by using the target network.

In the foregoing method, the Gaussian mask is used to highlight the local feature that is in the feature information extracted by the first network and that is about the target object, and highlight the local feature that is in the feature information extracted by the second network and that is about the target object. Then, the feature loss is determined based on the local features that are in the two networks and that are about the target object, and the second network is subsequently trained based on the feature loss. Background noise (including background noise outside a viewfinder frame of the target object and background noise inside the viewfinder frame of the target object) of the image is filtered out by using the Gaussian mask. The resulting feature loss can better reflect a difference between the second network and the first network. Therefore, training the second network based on the feature loss can enable expression of a feature by the second network to approximate expression of a feature by the first network, and model distillation effect is good.

With reference to the third aspect, in a first possible implementation of the third aspect, the parameter used for training the second network further includes a classification loss, the classification loss is determined based on a first classification predicted value and a second classification predicted value, the first classification predicted value is a classification predicted value that is generated by using a classification layer of the first network and that is of a target region proposal in a region proposal set, and the second classification predicted value is a classification predicted value that is generated by using a classification layer of the second network and that is of the target region proposal in the region proposal set.

In this possible implementation, the same region proposal set is selected, so that the classification layer of the first network and the classification layer of the second network generate the classification predicted values based on the same region proposal. When region proposals are the same, a difference between the predicted values generated by the two networks is usually caused by a difference between model parameters of the two networks. Therefore, in this embodiment, the classification loss used to train the second network is determined based on a difference between the first predicted value and the second predicted value. In this manner, a loss of the second network relative to the first network can be minimized. Therefore, training the second model based on the classification loss can enable a classification result of the second network to approximate a classification result of the first network, and the model distillation effect is good.

With reference to the third aspect or the first possible implementation of the third aspect, in a second possible implementation, the target network is specifically a network that is obtained after the second network is trained by using the first network and that is further trained by using a third network, and a depth of the third network is greater than the depth of the first network.

In this possible implementation, after the second network is trained by using the first network, the third network with more layers is further used to further train the trained second network, so that performance of the second network can be stably improved.

According to a fourth aspect, an embodiment of this application provides an image detection method, where the method includes:

obtaining a target network, where the target network is a network obtained by training a second network through iteration by using a plurality of networks, all the plurality of networks are classification networks, the plurality of networks include at least a first network and a third network, and the third network is used to train an intermediate network after the second network is trained by using the first network to obtain the intermediate network, where a depth of the third network is greater than a depth of the first network, and a depth of the first network is greater than a depth of the second network; and recognizing content in an image by using the target network.

In the foregoing method, after the second network is trained by using the first network, the third network with more layers is further used to further train the trained second network, so that performance of the second network can be stably improved.

With reference to the fourth aspect, in a first possible implementation of the fourth aspect, a parameter used when the second network is trained by using the first network includes a feature loss, the feature loss is determined based on a first local feature and a second local feature, the first local feature is a feature that is extracted from first feature information by using a Gaussian mask and that is about a target object, the second local feature is a feature that is extracted from second feature information by using the Gaussian mask and that is about the target object, the first feature information is feature information that is extracted by using a feature extraction layer of the first network and that is in a target image, and the second feature information is feature information that is extracted by using a feature extraction layer of the second network and that is in the target image.

In this possible implementation, the Gaussian mask is used to highlight the local feature that is in the feature information extracted by the first network and that is about the target object, and highlight the local feature that is in the feature information extracted by the second network and that is about the target object. Then, the feature loss is determined based on the local features that are in the two networks and that are about the target object, and the second network is subsequently trained based on the feature loss. Background noise (including background noise outside a viewfinder frame of the target object and background noise inside the viewfinder frame of the target object) of the image is filtered out by using the Gaussian mask. The resulting feature loss can better reflect a difference between the second network and the first network. Therefore, training the second network based on the feature loss can enable expression of a feature by the second network to approximate expression of a feature by the first network, and model distillation effect is good.

With reference to the first possible implementation of the fourth aspect, in a second possible implementation of the fourth aspect, the parameter used when the second network is trained by using the first network includes a classification loss, the classification loss is determined based on a first classification predicted value and a second classification predicted value, the first classification predicted value is a classification predicted value that is generated by using a classification layer of the first network and that is of a target region proposal in a region proposal set, and the second classification predicted value is a classification predicted value that is generated by using a classification layer of the second network and that is of the target region proposal in the region proposal set.

In this possible implementation, the same region proposal set is selected, so that the classification layer of the first network and the classification layer of the second network generate the classification predicted values based on the same region proposal. When region proposals are the same, a difference between the predicted values generated by the two networks is usually caused by a difference between model parameters of the two networks. Therefore, in this embodiment, the classification loss used to train the second network is determined based on a difference between the first predicted value and the second predicted value. In this manner, a loss of the second network relative to the first network can be minimized. Therefore, training the second model based on the classification loss can enable a classification result of the second network to approximate a classification result of the first network, and the model distillation effect is good.

With reference to the third aspect, the fourth aspect, any possible implementation of the third aspect, or any possible implementation of the fourth aspect, in still another possible implementation, both the first network and the second network have the region proposal set by sharing a region proposal network (RPN) between the first network and the second network.

With reference to the third aspect, the fourth aspect, any possible implementation of the third aspect, or any possible implementation of the fourth aspect, in still another possible implementation, the RPN is shared by the second network with the first network, or is shared by the first network with the second network.

With reference to the third aspect, the fourth aspect, any possible implementation of the third aspect, or any possible implementation of the fourth aspect, in still another possible implementation, the target region proposal is all region proposals in the region proposal set, or is a positive region proposal that is in the region proposal set and that belongs to the target object.

With reference to the third aspect, the fourth aspect, any possible implementation of the third aspect, or any possible implementation of the fourth aspect, in still another possible implementation, the classification loss $L_{cls}$ satisfies the following relationship:

$$L_{cls} = \sum_{m=1}^{K} L_{CE}(y_s^m, y^m) + \beta \sum_{n=1}^{N_p} L_{BCE}(y_s^n, y_t^n).$$

K is a total quantity of region proposals in the region proposal set, $N_p$ is a total quantity of positive region proposals that are in the region proposal set and that belong to the target object, $y_s^m$ is a classification predicted value predicted by the classification layer of the second network for an $m^{th}$ region proposal in the region proposal set, $y^m$ is a ground truth label corresponding to the $m^{th}$ region proposal in the region proposal set, $y^m$ is the second classification predicted value predicted by the classification layer of the second network for an $n^{th}$ positive region proposal that is in the region proposal set and that belongs to the target object, $y_n^t$ is the first classification predicted value predicted by the classification layer of the first network for the $n^{th}$ positive region proposal that is in the region proposal set and that belongs to the target object, $L_{CE}(y_s^m, y^m)$ represents a cross entropy loss obtained based on $y_s^m$ and $y^m$, $L_{BCE}(y_s^n, y_t^n)$ represents a binary cross entropy loss obtained based on $y_s^n$ and $y_t^n$, and $\beta$ is a preset weight balance factor.

With reference to the third aspect, the fourth aspect, any possible implementation of the third aspect, or any possible implementation of the fourth aspect, in still another possible implementation, the parameter used for training the second network further include a regression loss and an RPN loss of the second network, and the regression loss and the RPN loss of the second network are determined based on a ground truth label of a region proposal in the target image and a predicted value predicted by the second network for the region proposal in the target image.

With reference to the third aspect, the fourth aspect, any possible implementation of the third aspect, or any possible implementation of the fourth aspect, in still another possible implementation, the obtaining a target network includes:

receiving the target network sent by a model training device, where the model training device is configured to perform training to obtain the target network.

According to a fifth aspect, an embodiment of this application provides a model training apparatus, where the apparatus includes:

a feature extraction unit, configured to extract first feature information in a target image by using a feature extraction layer of a first network, where the feature extraction unit is further configured to extract second feature information in the target image by using a feature extraction layer of a second network, where both the first network and the second network are classification networks, and a depth of the first network is greater than a depth of the second network;

a first optimization unit, configured to extract a feature that is in the first feature information and that is about a target object by using a Gaussian mask to obtain a first local feature;

a second optimization unit, configured to extract a feature that is in the second feature information and that is about the target object by using the Gaussian mask to obtain a second local feature;

a first determining unit, configured to determine a feature loss by using the first local feature and the second local feature; and a weight adjustment unit, configured to train the second network based on the feature loss to obtain a target network.

In the foregoing method, the Gaussian mask is used to highlight the local feature that is in the feature information extracted by the first network and that is about the target object, and highlight the local feature that is in the feature information extracted by the second network and that is about the target object. Then, the feature loss is determined based on the local features that are in the two networks and that are about the target object, and the second network is subsequently trained based on the feature loss. Background noise (including background noise outside a viewfinder frame of the target object and background noise inside the viewfinder frame of the target object) of the image is filtered out by using the Gaussian mask. The resulting feature loss can better reflect a difference between the second network and the first network. Therefore, training the second network based on the feature loss can enable expression of a feature by the second network to approximate expression of a feature by the first network, and model distillation effect is good.

With reference to the fifth aspect, in a first possible implementation of the fifth aspect, the apparatus further includes:

a first generation unit, configured to generate a first classification predicted value of a target region proposal in a region proposal set by using a classification layer of the first network;

a second generation unit, configured to generate a second classification predicted value of the target region proposal in the region proposal set by using a classification layer of the second network; and a second determining unit, configured to determine a classification loss based on the first classification predicted value and the second classification predicted value, where the weight adjustment unit is specifically configured to train the second network based on the feature loss and the classification loss to obtain the target network.

In this possible implementation, the same region proposal set is selected, so that the classification layer of the first network and the classification layer of the second network generate the classification predicted values based on the same region proposal. When region proposals are the same, a difference between the predicted values generated by the two networks is usually caused by a difference between model parameters of the two networks. Therefore, in this embodiment, the classification loss used to train the second network is determined based on a difference between the first predicted value and the second predicted value. In this manner, a loss of the second network relative to the first network can be minimized. Therefore, training the second model based on the classification loss can enable a classification result of the second network to approximate a classification result of the first network, and the model distillation effect is good.

With reference to the fifth aspect or any possible implementation of the fifth aspect, in a second possible implementation of the fifth aspect, when the second network is trained based on the feature loss to obtain the target network, the weight adjustment unit is specifically configured to:

train the second network based on the feature loss; and train the trained second network by using a third network to obtain the target network, where a depth of the third network is greater than the depth of the first network.

In this possible implementation, after the second network is trained by using the first network, the third network with more layers is further used to further train the trained second network, so that performance of the second network can be stably improved.

According to a sixth aspect, an embodiment of this application provides a model training apparatus, where the apparatus includes:

a first training unit, configured to train a second network based on a first network to obtain an intermediate network; and a second training unit, configured to train the intermediate network based on a third network to obtain a target network, where all the first network, the second network, and the third network are classification networks, a depth of the third network is greater than a depth of the first network, and the depth of the first network is greater than a depth of the second network.

In the foregoing method, after the second network is trained by using the first network, the third network with more layers is further used to further train the trained second network, so that performance of the second network can be stably improved.

With reference to the sixth aspect, in a first possible implementation of the sixth aspect, the training a second network based on a first network to obtain an intermediate network includes:

extracting first feature information in a target image by using a feature extraction layer of the first network;

extracting second feature information in the target image by using a feature extraction layer of the second network;

extracting a feature that is in the first feature information and that is about a target object by using a Gaussian mask to obtain a first local feature;

extracting a feature that is in the second feature information and that is about the target object by using the Gaussian mask to obtain a second local feature;

determining a feature loss by using the first local feature and the second local feature; and training the second network based on the feature loss to obtain the intermediate network.

In this possible implementation, the Gaussian mask is used to highlight the local feature that is in the feature information extracted by the first network and that is about the target object, and highlight the local feature that is in the feature information extracted by the second network and that is about the target object. Then, the feature loss is determined based on the local features that are in the two networks and that are about the target object, and the second network is subsequently trained based on the feature loss. Background noise (including background noise outside a viewfinder frame of the target object and background noise inside the viewfinder frame of the target object) of the image is filtered out by using the Gaussian mask. The resulting feature loss can better reflect a difference between the second network and the first network. Therefore, training the second network based on the feature loss can enable expression of a feature by the second network to approximate expression of a feature by the first network, and model distillation effect is good.

With reference to the sixth aspect or the first possible implementation of the sixth aspect, in a second possible implementation of the sixth aspect, the apparatus further includes:
 a first generation unit, configured to generate a first classification predicted value of a target region proposal in a region proposal set by using a classification layer of the first network;
 a second generation unit, configured to generate a second classification predicted value of the target region proposal in the region proposal set by using a classification layer of the second network; and
 a second determining unit, configured to determine a classification loss based on the first classification predicted value and the second classification predicted value, where
 the training the second network based on the feature loss to obtain the intermediate network is specifically:
 training the second network based on the feature loss and the classification loss to obtain the intermediate network.

In this possible implementation, the same region proposal set is selected, so that the classification layer of the first network and the classification layer of the second network generate the classification predicted values based on the same region proposal. When region proposals are the same, a difference between the predicted values generated by the two networks is usually caused by a difference between model parameters of the two networks. Therefore, in this embodiment, the classification loss used to train the second network is determined based on a difference between the first predicted value and the second predicted value. In this manner, a loss of the second network relative to the first network can be minimized. Therefore, training the second model based on the classification loss can enable a classification result of the second network to approximate a classification result of the first network, and the model distillation effect is good.

With reference to the fifth aspect, the sixth aspect, any possible implementation of the fifth aspect, or any possible implementation of the sixth aspect, in still another possible implementation, both the first network and the second network have the region proposal set by sharing a region proposal network (RPN) between the first network and the second network.

With reference to the fifth aspect, the sixth aspect, any possible implementation of the fifth aspect, or any possible implementation of the sixth aspect, in still another possible implementation, the RPN is shared by the second network with the first network, or is shared by the first network with the second network.

With reference to the fifth aspect, the sixth aspect, any possible implementation of the fifth aspect, or any possible implementation of the sixth aspect, in still another possible implementation, the target region proposal is all region proposals in the region proposal set, or is a positive region proposal that is in the region proposal set and that belongs to the target object.

With reference to the fifth aspect, the sixth aspect, any possible implementation of the fifth aspect, or any possible implementation of the sixth aspect, in still another possible implementation, the classification loss $L_{cls}$ satisfies the following relationship:

$$L_{cls} = \sum_{m=1}^{K} L_{CE}(y_s^m, y^m) + \beta \sum_{n=1}^{N_p} L_{BCE}(y_s^n, y_t^n).$$

K is a total quantity of region proposals in the region proposal set, $N_p$ is a total quantity of positive region proposals that are in the region proposal set and that belong to the target object, $y_s^m$ is a classification predicted value predicted by the classification layer of the second network for an $m^{th}$ region proposal in the region proposal set, $y^m$ is a ground truth label corresponding to the $m^{th}$ region proposal in the region proposal set, $y_s^n$ is the second classification predicted value predicted by the classification layer of the second network for an $n^{th}$ positive region proposal that is in the region proposal set and that belongs to the target object, $y_t^n$ is the first classification predicted value predicted by the classification layer of the first network for the $n^{th}$ positive region proposal that is in the region proposal set and that belongs to the target object, $L_{CE}(y_s^m, y^m)$ represents a cross entropy loss obtained based on $y_s^m$ and $y^m$, $L_{BCE}(y_s^n, y_t^n)$ represents a binary cross entropy loss obtained based on $y_s^n$ and $y_t^n$, and $\beta$ is a preset weight balance factor.

With reference to the fifth aspect, the sixth aspect, any possible implementation of the fifth aspect, or any possible implementation of the sixth aspect, in still another possible implementation, the apparatus further includes:
 a third determining unit, configured to determine a regression loss and an RPN loss of the second network based on a ground truth label of a region proposal in the target image and a predicted value predicted by the second network for the region proposal in the target image, where
 the weight adjustment unit is specifically configured to train the second network based on the feature loss, the classification loss, the regression loss, and the RPN loss to obtain the target network.

With reference to the fifth aspect, the sixth aspect, any possible implementation of the fifth aspect, or any possible implementation of the sixth aspect, in still another possible implementation, the apparatus further includes:
 a sending unit, configured to: after the weight adjustment unit trains the second network based on the feature loss to obtain the target network, send the target network to a model using device, where the target network is used to predict content in an image.

According to a seventh aspect, an embodiment of this application provides an image detection apparatus, where the apparatus includes:

an obtaining unit, configured to obtain a target network, where the target network is a network obtained after a second network is trained by using a first network, a parameter used for training the second network by using the first network includes a feature loss, the feature loss is determined based on a first local feature and a second local feature, the first local feature is a feature that is extracted from first feature information by using a Gaussian mask and that is about a target object, the second local feature is a feature that is extracted from second feature information by using the Gaussian mask and that is about the target object, the first feature information is feature information that is extracted by using a feature extraction layer of the first network and that is in a target image, the second feature information is feature information that is extracted by using a feature extraction layer of the second network and that is in the target image, both the first network and the second network are classification networks, and a depth of the first network is greater than a depth of the second network; and a recognition unit, configured to recognize content in an image by using the target network.

In the foregoing method, the Gaussian mask is used to highlight the local feature that is in the feature information extracted by the first network and that is about the target object, and highlight the local feature that is in the feature information extracted by the second network and that is about the target object. Then, the feature loss is determined based on the local features that are in the two networks and that are about the target object, and the second network is subsequently trained based on the feature loss. Background noise (including background noise outside a viewfinder frame of the target object and background noise inside the viewfinder frame of the target object) of the image is filtered out by using the Gaussian mask. The resulting feature loss can better reflect a difference between the second network and the first network. Therefore, training the second network based on the feature loss can enable expression of a feature by the second network to approximate expression of a feature by the first network, and model distillation effect is good.

With reference to the seventh aspect, in a first possible implementation of the seventh aspect, the parameter used for training the second network further includes a classification loss, the classification loss is determined based on a first classification predicted value and a second classification predicted value, the first classification predicted value is a classification predicted value that is generated by using a classification layer of the first network and that is of a target region proposal in a region proposal set, and the second classification predicted value is a classification predicted value that is generated by using a classification layer of the second network and that is of the target region proposal in the region proposal set.

In this possible implementation, the same region proposal set is selected, so that the classification layer of the first network and the classification layer of the second network generate the classification predicted values based on the same region proposal. When region proposals are the same, a difference between the predicted values generated by the two networks is usually caused by a difference between model parameters of the two networks. Therefore, in this embodiment, the classification loss used to train the second network is determined based on a difference between the first predicted value and the second predicted value. In this manner, a loss of the second network relative to the first network can be minimized. Therefore, training the second model based on the classification loss can enable a classification result of the second network to approximate a classification result of the first network, and the model distillation effect is good.

With reference to the seventh aspect or the first possible implementation of the seventh aspect, in a second possible implementation of the seventh aspect, the target network is specifically a network that is obtained after the second network is trained by using the first network and that is further trained by using a third network, and a depth of the third network is greater than the depth of the first network.

In this possible implementation, after the second network is trained by using the first network, the third network with more layers is further used to further train the trained second network, so that performance of the second network can be stably improved.

According to an eighth aspect, an embodiment of this application provides an image detection apparatus, where the apparatus includes:

an obtaining unit, configured to obtain a target network, where the target network is a network obtained by training a second network through iteration by using a plurality of networks, all the plurality of networks are classification networks, the plurality of networks include at least a first network and a third network, and the third network is used to train an intermediate network after the second network is trained by using the first network to obtain the intermediate network, where a depth of the third network is greater than a depth of the first network, and a depth of the first network is greater than a depth of the second network; and a recognition unit, configured to recognize content in an image by using the target network.

In the foregoing method, after the second network is trained by using the first network, the third network with more layers is further used to further train the trained second network, so that performance of the second network can be stably improved.

With reference to the eighth aspect, in a first possible implementation of the eighth aspect, a parameter used when the second network is trained by using the first network includes a feature loss, the feature loss is determined based on a first local feature and a second local feature, the first local feature is a feature that is extracted from first feature information by using a Gaussian mask and that is about a target object, the second local feature is a feature that is extracted from second feature information by using the Gaussian mask and that is about the target object, the first feature information is feature information that is extracted by using a feature extraction layer of the first network and that is in a target image, and the second feature information is feature information that is extracted by using a feature extraction layer of the second network and that is in the target image.

In this possible implementation, the Gaussian mask is used to highlight the local feature that is in the feature information extracted by the first network and that is about the target object, and highlight the local feature that is in the feature information extracted by the second network and that is about the target object. Then, the feature loss is determined based on the local features that are in the two networks and that are about the target object, and the second network is subsequently trained based on the feature loss. Background noise (including background noise outside a viewfinder frame of the target object and background noise inside the viewfinder frame of the target object) of the image is filtered out by using the Gaussian mask. The resulting feature loss can better reflect a difference between the second network and the first network. Therefore, training the second network based on the feature loss can enable expression of a feature by the second network to approximate expression of a feature by the first network, and model distillation effect is good.

With reference to the first possible implementation of the eighth aspect, in a second possible implementation of the eighth aspect, the parameter used when the second network is trained by using the first network includes a classification loss, the classification loss is determined based on a first classification predicted value and a second classification predicted value, the first classification predicted value is a classification predicted value that is generated by using a classification layer of the first network and that is of a target region proposal in a region proposal set, and the second classification predicted value is a classification predicted value that is generated by using a classification layer of the second network and that is of the target region proposal in the region proposal set.

In this possible implementation, the same region proposal set is selected, so that the classification layer of the first network and the classification layer of the second network generate the classification predicted values based on the same region proposal. When region proposals are the same, a difference between the predicted values generated by the two networks is usually caused by a difference between model parameters of the two networks. Therefore, in this embodiment, the classification loss used to train the second network is determined based on a difference between the first predicted value and the second predicted value. In this manner, a loss of the second network relative to the first network can be minimized. Therefore, training the second model based on the classification loss can enable a classification result of the second network to approximate a classification result of the first network, and the model distillation effect is good.

With reference to the seventh aspect, the eighth aspect, any possible implementation of the seventh aspect, or any possible implementation of the eighth aspect, in still another possible implementation, both the first network and the second network have the region proposal set by sharing a region proposal network (RPN) between the first network and the second network.

With reference to the seventh aspect, the eighth aspect, any possible implementation of the seventh aspect, or any possible implementation of the eighth aspect, in still another possible implementation, the RPN is shared by the second network with the first network, or is shared by the first network with the second network.

With reference to the seventh aspect, the eighth aspect, any possible implementation of the seventh aspect, or any possible implementation of the eighth aspect, in still another possible implementation, the target region proposal is all region proposals in the region proposal set, or is a positive region proposal that is in the region proposal set and that belongs to the target object.

With reference to the seventh aspect, the eighth aspect, any possible implementation of the seventh aspect, or any possible implementation of the eighth aspect, in still another possible implementation, the classification loss $L_{cls}$ satisfies the following relationship:

$$L_{cls} = \sum_{m=1}^{K} L_{CE}(y_s^m, y^m) + \beta \sum_{n=1}^{N_p} L_{BCE}(y_s^n, y_t^n).$$

K is a total quantity of region proposals in the region proposal set, $N_p$ is a total quantity of positive region proposals that are in the region proposal set and that belong to the target object, $y_s^m$ is a classification predicted value predicted by the classification layer of the second network for an $m^{th}$ region proposal in the region proposal set, $y^m$ is a ground truth label corresponding to the $m^{th}$ region proposal in the region proposal set, $y_s^n$ is the second classification predicted value predicted by the classification layer of the second network for an $n^{th}$ positive region proposal that is in the region proposal set and that belongs to the target object, $y_t^n$ is the first classification predicted value predicted by the classification layer of the first network for the $n^{th}$ positive region proposal that is in the region proposal set and that belongs to the target object, $L_{CE}(y_s^m, y^m)$ represents a cross entropy loss obtained based on $y_s^m$ and $y^m$, $L_{BCE}(y_s^n, y_t^n)$ represents a binary cross entropy loss obtained based on $y_s^n$ and $y_t^n$, and $\beta$ is a preset weight balance factor.

With reference to the seventh aspect, the eighth aspect, any possible implementation of the seventh aspect, or any possible implementation of the eighth aspect, in still another possible implementation, the parameter used for training the second network further include a regression loss and an RPN loss of the second network, and the regression loss and the RPN loss of the second network are determined based on a ground truth label of a region proposal in the target image and a predicted value predicted by the second network for the region proposal in the target image.

With reference to the seventh aspect, the eighth aspect, any possible implementation of the seventh aspect, or any possible implementation of the eighth aspect, in still another possible implementation, the obtaining unit is specifically configured to:

receive the target network sent by a model training device, where the model training device is configured to perform training to obtain the target network.

According to a ninth aspect, an embodiment of this application provides a model training device, where the model training device includes a memory and a processor, the memory is configured to store a computer program, and the processor is configured to invoke the computer program to implement the method described in any one of the first aspect, the second aspect, the possible implementations of the first aspect, or the possible implementations of the second aspect.

According to a tenth aspect, an embodiment of this application provides a model using device, where the model using device includes a memory and a processor, the memory is configured to store a computer program, and the processor is configured to invoke the computer program to implement the method described in any one of the third aspect, the fourth aspect, the possible implementations of the third aspect, or the possible implementations of the fourth aspect.

According to an eleventh aspect, an embodiment of this application provides a computer-readable storage medium, where the computer-readable storage medium is configured to store a computer program, and when the computer program runs on a processor, the method described in any one of the first aspect, the second aspect, the third aspect, the fourth aspect, or the possible implementations of the foregoing aspects is implemented.

BRIEF DESCRIPTION OF DRAWINGS

The following describes accompanying drawings used in embodiments of this application.

DESCRIPTION OF EMBODIMENTS

The following describes embodiments of this application with reference to the accompanying drawings in embodiments of this application.

Figure 1:
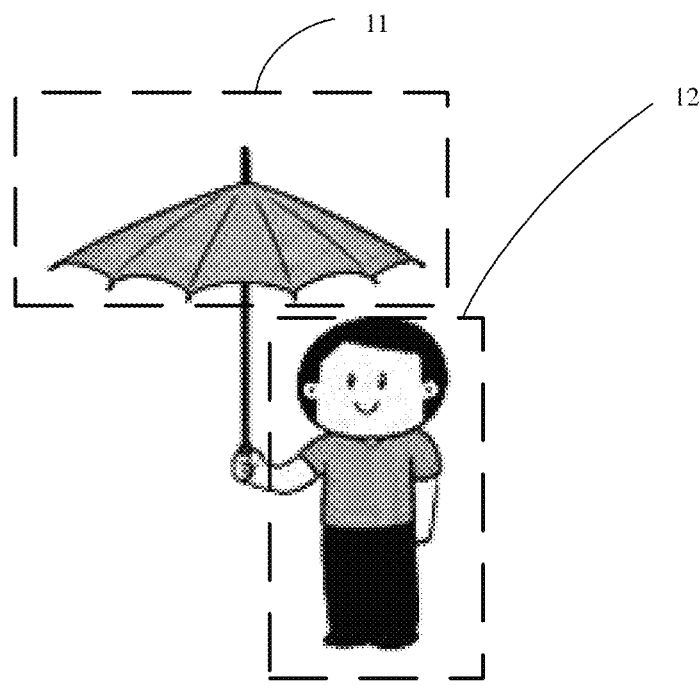
FIG. 1 is a schematic diagram of an image detection scenario according to an embodiment of this application.
Figure 2:
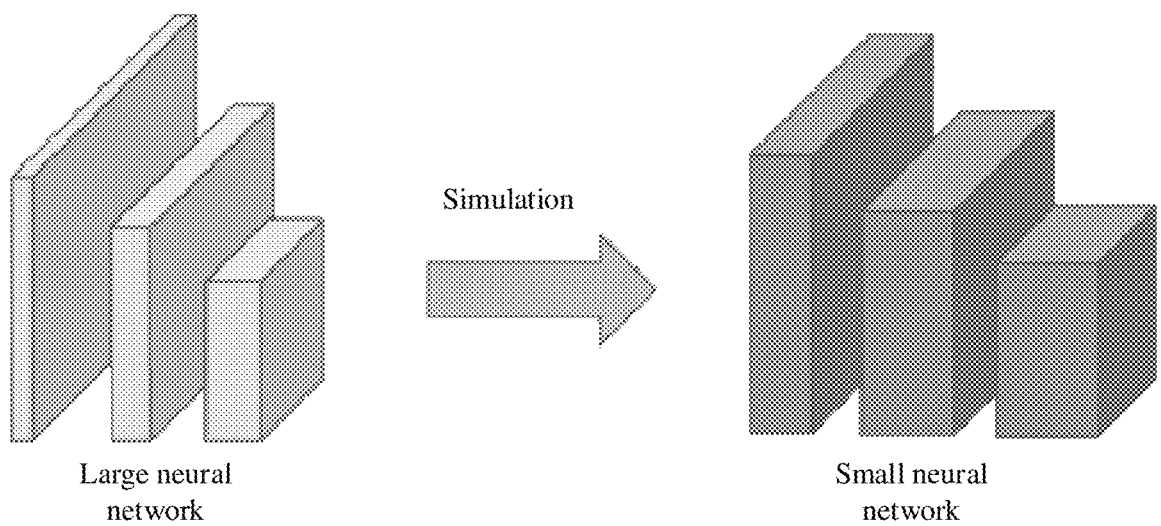
FIG. 2 is a schematic diagram of a model distillation scenario according to an embodiment of this application.

Image detection is usually required in fields such as artificial intelligence and computer vision, that is, recognizing an object (or a target) in an image. Image detection is usually implemented by using a neural network. When facing a technical problem of how to train a neural network with a fast detection speed and an accurate detection result to perform target detection, a model distillation manner may be used to resolve the problem. As shown in FIG. 2, specifically a large neural network is used to guide training of a small neural network. In other words, the small neural network simulates performance of the large neural network, so that the small neural network can have an accurate detection result as the large neural network. In this way, the small neural network has advantages of both a fast detection speed and the accurate detection result.

The following describes several solutions in which the large neural network is used to guide the training of the small neural network.

Figure 3:
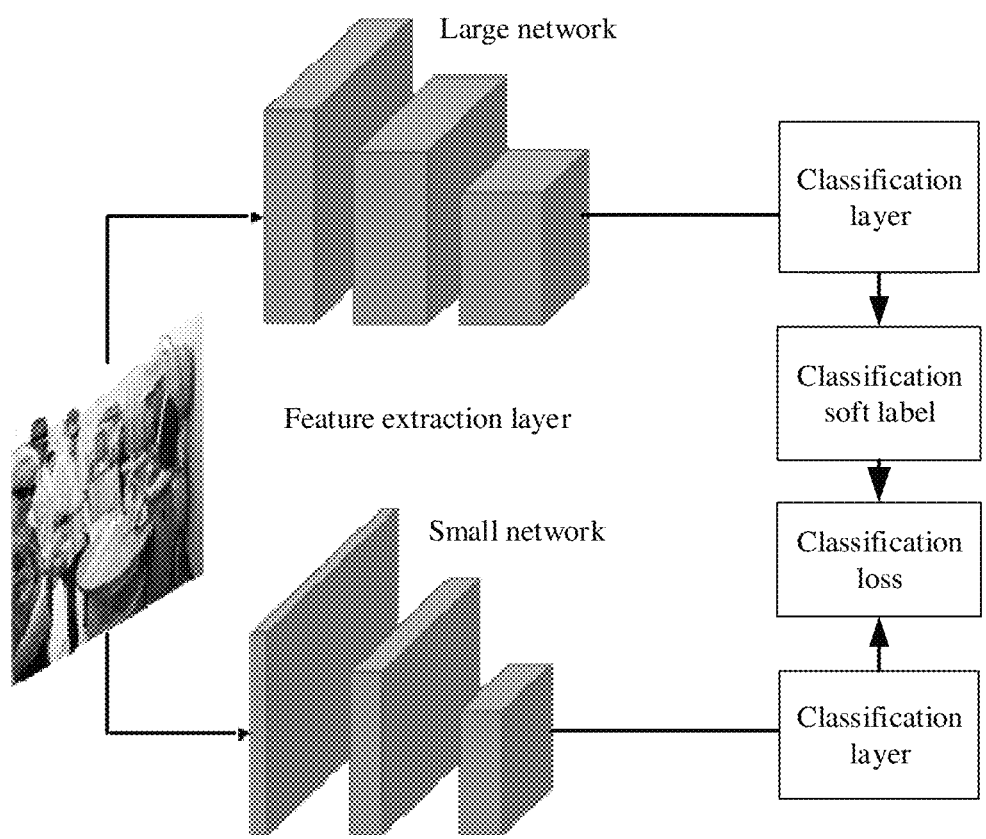
FIG. 3 is a schematic diagram of still another model distillation scenario according to an embodiment of this application.

For example, as shown in FIG. 3, feature information of an image is extracted by using a feature extraction layer of the large neural network, and then sent to a classification layer of the large neural network to generate a classification soft label. Feature information of the image is extracted by using a feature extraction layer of the small neural network, and then sent to a classification layer of the small neural network to generate a classification soft label. Then, a classification loss is determined by using the classification soft labels generated by the two networks, and then the classification loss is used to guide training of the classification layer of the small neural network. However, in this solution, the small neural network is not comprehensively and refinedly guided by the large neural network (for example, guidance on the feature extraction layer is ignored). Therefore, effect after guidance is not ideal.

Figure 4:
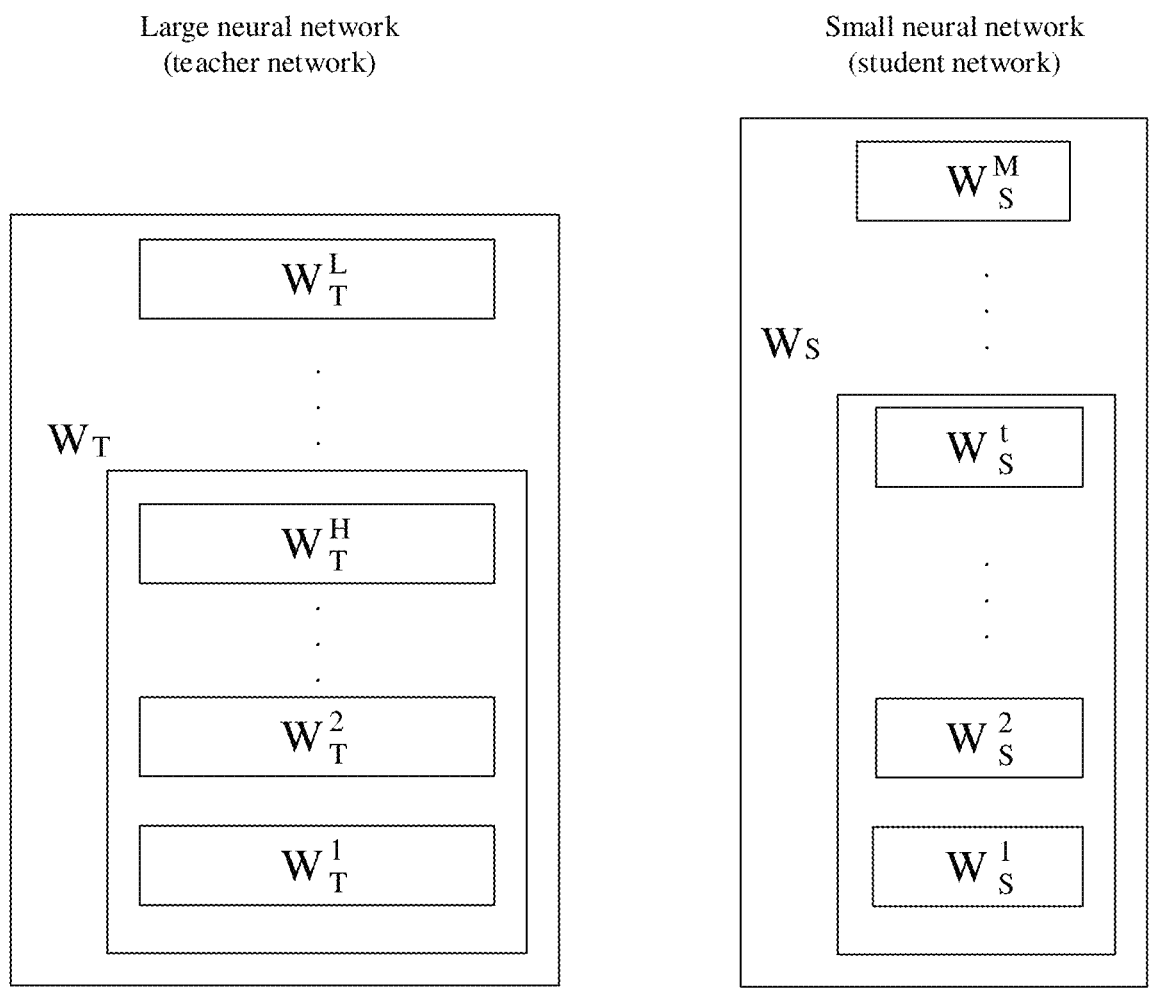
FIG. 4 is a schematic diagram of still another model distillation scenario according to an embodiment of this application.

For another example, as shown in FIG. 4, information about the feature extraction layer of the large neural network is transferred to the small neural network, and then the small neural network having the information about the feature extraction layer of the large neural network is compressed to obtain a new thinner and deeper small neural network. In FIG. 4, $W_T$ is a model weight of the large neural network (teacher network), and different layers may have different weights, for example, $W_T^L$, $W_T^h$, $W_T^2$, $W_T^1$, and the like. In FIG. 4, $W_S$ is a model weight of the small neural network (student network), and different layers may have different weights, for example, $W_S^M$, $W_S^E$, $W_S^2$, $W_S^1$, and the like. However, in this solution, the new small neural network needs to be constructed, and the constructed new small neural network has more layers, which is complex. In addition, in this solution, features in an entire image are extracted by using the feature extraction layer, and there is a large amount of background noise. Therefore, a detection result is not ideal.

Figure 5:
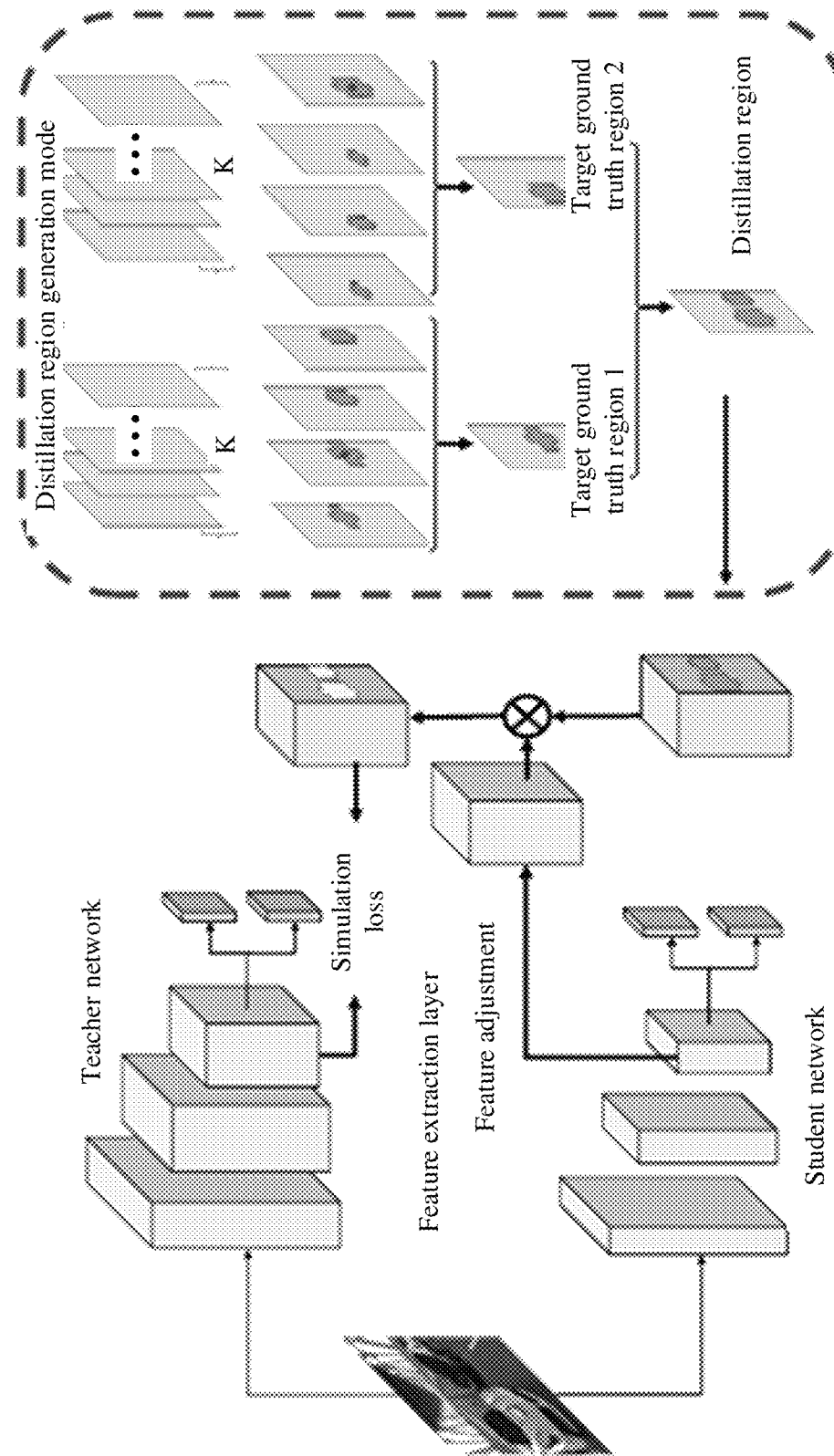
FIG. 5 is a schematic diagram of still another model distillation scenario according to an embodiment of this application.

For another example, as shown in FIG. 5, a region near a target region in an image is selected as a distillation region, and the small neural network learns expression of the large neural network of the feature extraction layer in the distillation region. However, there is still a large amount of useless background noise in the distillation region. Therefore, the learned expression of the feature extraction layer is still not ideal, the small neural network learns only the expression of the feature extraction layer, and performance improvement is limited.

Because there is still a plurality of limitations in guiding the training of the small neural network by the large neural network, the following embodiments of this application further provide a related architecture, device, and method to further improve effect of guiding the training of the small neural network by the large neural network.

Figure 6:
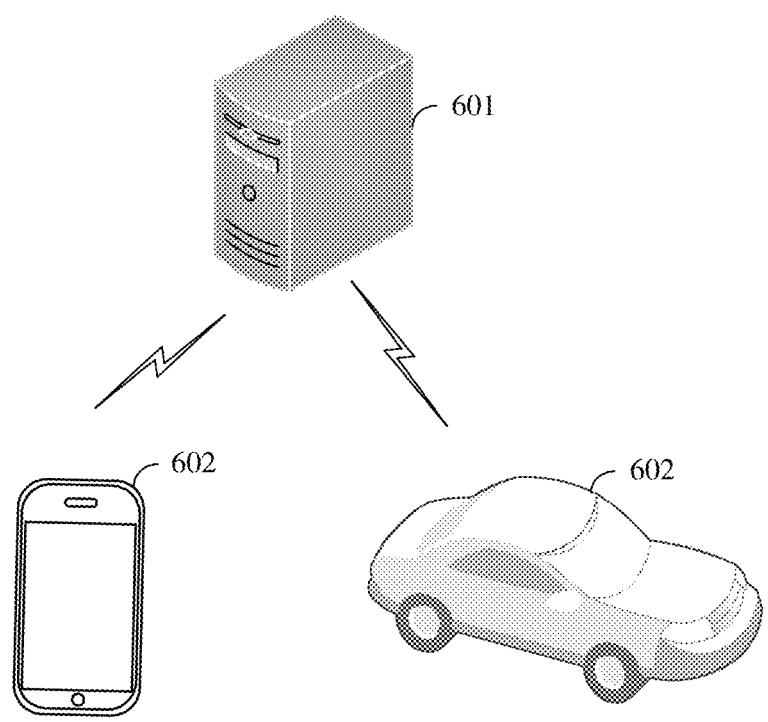
FIG. 6 is a schematic diagram of an architecture of model training according to an embodiment of this application.

FIG. 6 is a schematic diagram of an architecture of model training according to an embodiment of this application. The architecture includes a model training device 601 and one or more model using devices 602. The model training device 601 communicates with the model using device 602 in a wired or wireless manner, and the model training device 601 may send, to the model using device 602, a trained model (or network) used to predict a target object in an image. Correspondingly, the model using device 602 predicts the target object in the to-be-predicted image by using the received model.

Optionally, the model using device 602 may feed back a prediction result based on the model to the model training device 601, so that the model training device 601 may further train the model based on the prediction result of the model using device 602. A retrained model may be sent to the model using device 602 to update the original model.

The model training device 601 may be a device having a strong computing capability, for example, a server, or a server cluster including a plurality of servers. The model training device 601 may include a plurality of neural networks. A neural network with a larger quantity of layers may be referred to as a large neural network relative to a neural network with a smaller quantity of layers, and a neural network with a smaller quantity of layers may be referred to as a small neural network relative to a neural network with a larger quantity of layers. In other words, a depth of a first network is greater than a depth of a second network.

Figure 7:
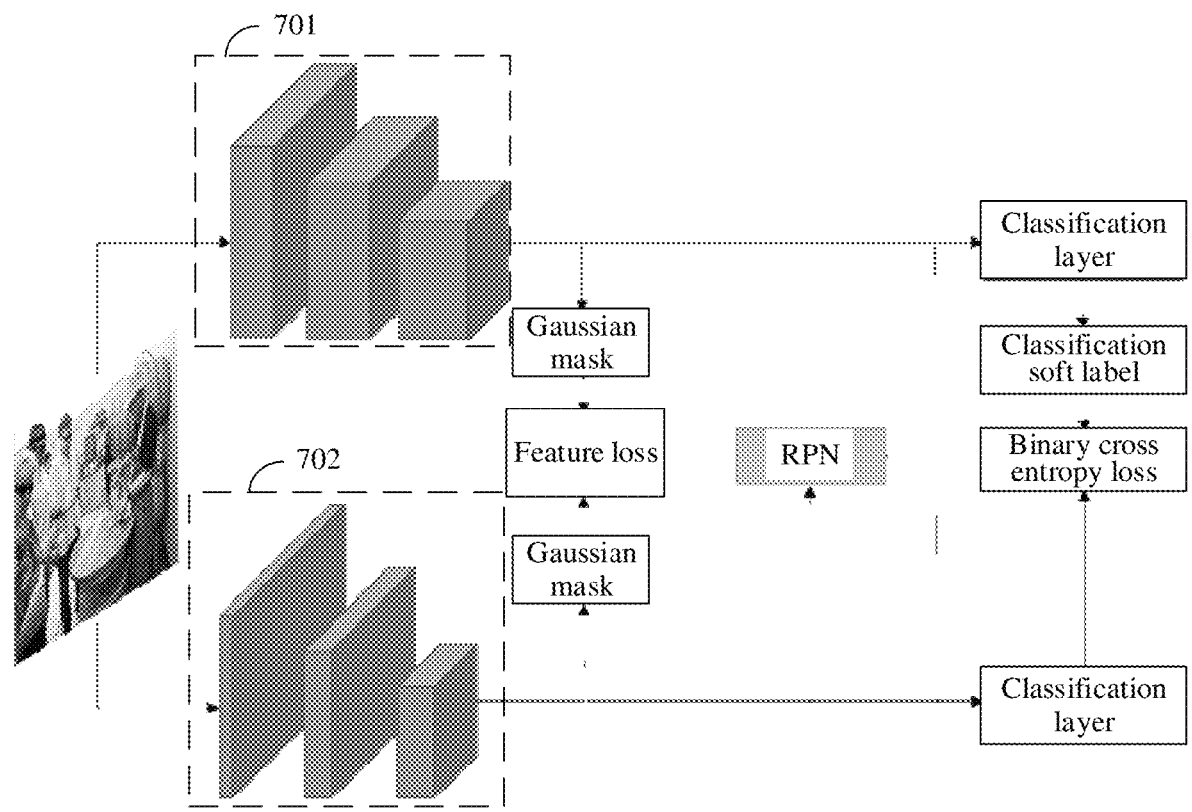
FIG. 7 is a schematic diagram of still another model distillation scenario according to an embodiment of this application.

As shown in FIG. 7, the model training device 601 includes the first network 701 and the second network 702. The first network 701 may be a neural network larger than the second network 702. Both the first network 701 and the second network 702 include a feature extraction layer (which may also be referred to as a feature layer) and a classification layer (which may also be referred to as a classifier or a classification header). The feature extraction layer is used to extract feature information in an image, and the classification layer is used to classify a target object in the image based on the extracted feature information.

In this embodiment, the first network 701 may be used as a teacher network, the second network 702 may be used as a student network, and the first network 701 guides training of the second network 702. This process may be referred to as distillation. In this embodiment, an idea of guiding the second network 702 by the first network 701 includes the following three technical points.

1. Feature information is separately extracted by using the feature extraction layer of the first network 701 and the feature extraction layer of the second network 702, and feature information that is in the feature information extracted by using the feature extraction layers of the two networks and that is about the target object is highlighted by using a Gaussian mask. A feature loss is determined by using the feature information that is extracted by the first network and that is about the target object and the feature information that is extracted by the second network and that is about the target object, and then training of the feature extraction layer of the second network 702 is guided based on the feature loss.

2. The first network 701 and the second network 702 select a same region proposal set. For example, both the first network and the second network have the region proposal set by sharing a region proposal network (RPN). Therefore, the first network 701 and the second network 702 may generate a soft label based on a same region proposal, and obtain a binary cross entropy loss (BCEloss) based on the soft label generated by the first network 701 and the soft label generated by the second network 702. Then, training of the classification layer of the second network 702 is guided based on the binary cross entropy loss (BCEloss).

3. The training of the second network 702 is guided in a progressive distillation manner. For example, if the first network 701 is a 101-layer (res101) neural network, and the second network 702 is a 50-layer (res50) neural network, after the second network 702 is trained by using the first network 701 based on the foregoing technical points 1 and/or 2 to obtain a target neural network (which may be denoted as res101-50), the target neural network (res101-50) is further trained by using a third neural network. A principle of training the target neural network by using the third neural network is the same as a principle of training the second network 702 by using the first network 701. Details are not described herein again. The third neural network herein is a neural network larger than the first network 701. For example, the third neural network is a 152-layer (res152) neural network.

Implementations of the foregoing 1, 2, and 3 are described in more detail in the following method embodiments.

The model using device 602 is a device that needs to recognize (or detect) an image, for example, a handheld device (for example, a mobile phone, a tablet computer, a palmtop computer, or the like), a vehicle-mounted device (for example, a vehicle, a bicycle, an electric vehicle, an airplane, a ship, or the like), a wearable device (for example, a smartwatch (for example, iWatch or the like), a smart band, a pedometer, or the like), a smart home device (for example, a refrigerator, a television, an air conditioner, an electric meter, or the like), a smart robot, a workshop device, or the like.

The following separately uses an example in which the model using device 602 is the vehicle and the mobile phone.

Figure 8:
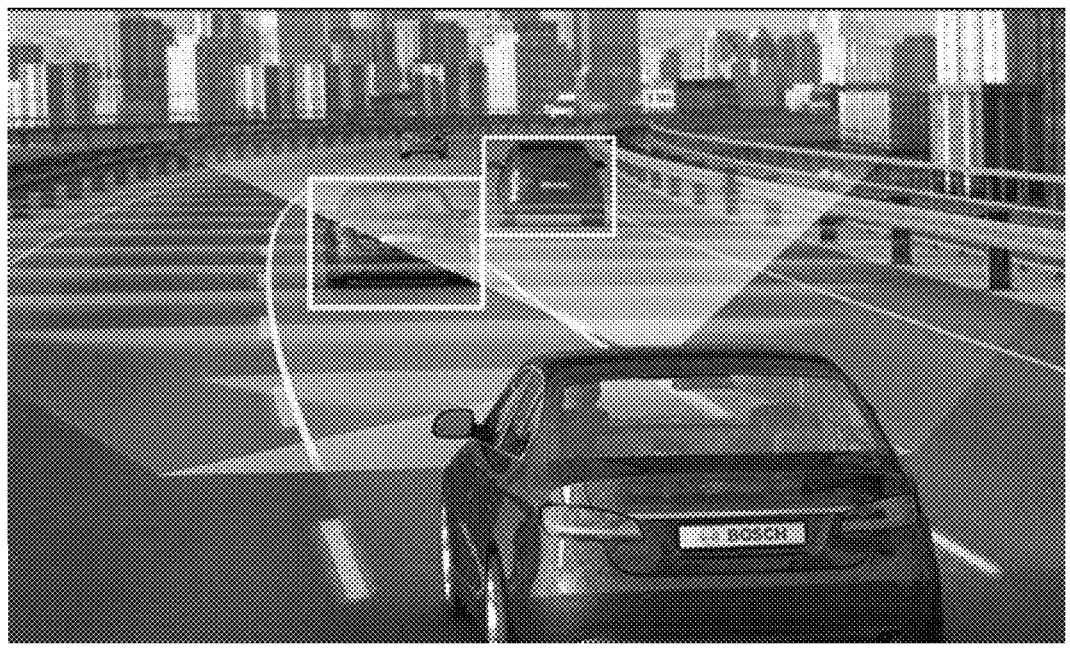
FIG. 8 is a schematic diagram of still another image detection scenario according to an embodiment of this application.

Currently, it is a very popular topic to implement self driving or computer driving of a vehicle. With the development of economy, quantities of vehicles around the world keep rising. As a result, road congestion and driving accidents have caused great losses to people's property. Human factors are main factors that cause traffic accidents. Intelligent obstacle avoidance, reasonable planning, and how to reduce human errors are important topics to improve driving safety. Emergence of autonomous driving makes it possible to sense an ambient environment and provide navigation without human intervention. Currently, major companies around the world, such as Google, Tesla, and Baidu, start to pay attention to and develop autonomous driving systems. The autonomous driving technology has become strategic high ground for countries to compete for. Because a camera device has advantages such as cost-effectiveness and easy to use, it is a research and development direction of a plurality of companies to construct a perception system mainly based on visual perception. FIG. 8 shows a road surface scenario captured by a vehicle-mounted camera in an autonomous driving process. A visual perception system on a vehicle acts as a human eye (that is, computer vision). An image captured by a camera is automatically detected by using a detection network (for example, a target network, a first network, a second network, a third network, or a fourth network mentioned in the following method embodiments, where the detection network may also be referred to as a classification network, a detection model, a detection module, or the like). In this way, an object around the vehicle and a location of the object are determined (that is, a target object in the image is detected).

For example, the vehicle recognizes the object in the image by using the detection network. If a person is detected in the image and is close to the vehicle, the vehicle may be controlled to decelerate or stop to avoid casualties. If it is detected that there is another vehicle in the image, a driving speed of the vehicle may be properly controlled to avoid rear-end collision. If it is detected that an object in the image is quickly colliding with the vehicle, the vehicle may be controlled to avoid the object through displacement, lane change, or the like.

For another example, the vehicle recognizes the object in the image by using the detection network. If it is detected that there is a traffic lane line (for example, a double yellow line, a single yellow line, a lane boundary, or the like) on a road, a driving status of the vehicle may be predicted. If it is predicted that the vehicle may drive on the line, the vehicle may be correspondingly controlled to avoid driving on the line. Alternatively, when the lane boundary and the location of the lane boundary are recognized, how to change a lane may be determined based on the information, and control of other traffic lines may be deduced by analogy.

For another example, the vehicle recognizes the object in the image by using the detection network, and then calculates information such as a driving speed, acceleration, and a turning angle of the vehicle by using the recognized object as a reference.

Figure 9:
FIG. 9 is a schematic diagram of still another image detection scenario according to an embodiment of this application.

A mobile phone is originally used as a communication tool to facilitate communication between people. With the development of global economy and improvement of people's quality of life, people are increasingly pursuing a sense of experience and performance of mobile phones. In addition to entertainment, navigation, shopping, and photographing, detection and recognition functions also attract great attention. Currently, a recognition technology for detecting a target object in an image has been applied to a plurality of mobile applications, including Meitu, MojiPop, PowerCam, Camera360, Alipay face scanning payment, and the like. Developers only need to invoke authorized mobile SDK packages for face detection, face key point detection, and face analysis to automatically recognize faces in photos and video (that is, detect target objects in images). FIG. 9 shows a face image captured by a camera of a mobile phone. The mobile phone positions and recognizes an object in the image by using a detection network (for example, a target network mentioned in the following method embodiments, where the detection network may also be referred to as a detection model, a detection module, or a detection and recognition system) to find a face (and further obtain a location of the face), determines whether the face in the image is a face of a specific person (that is, a computer perspective), and if yes, performs a next operation, for example, a plurality of functions such as mobile payment and face login.

A device (such as a vehicle or a mobile phone) senses ambient environment information from the computer perspective, to perform corresponding intelligent control based on the environment information. Intelligent control completed based on the computer perspective is an implementation of artificial intelligence.

Figure 10:
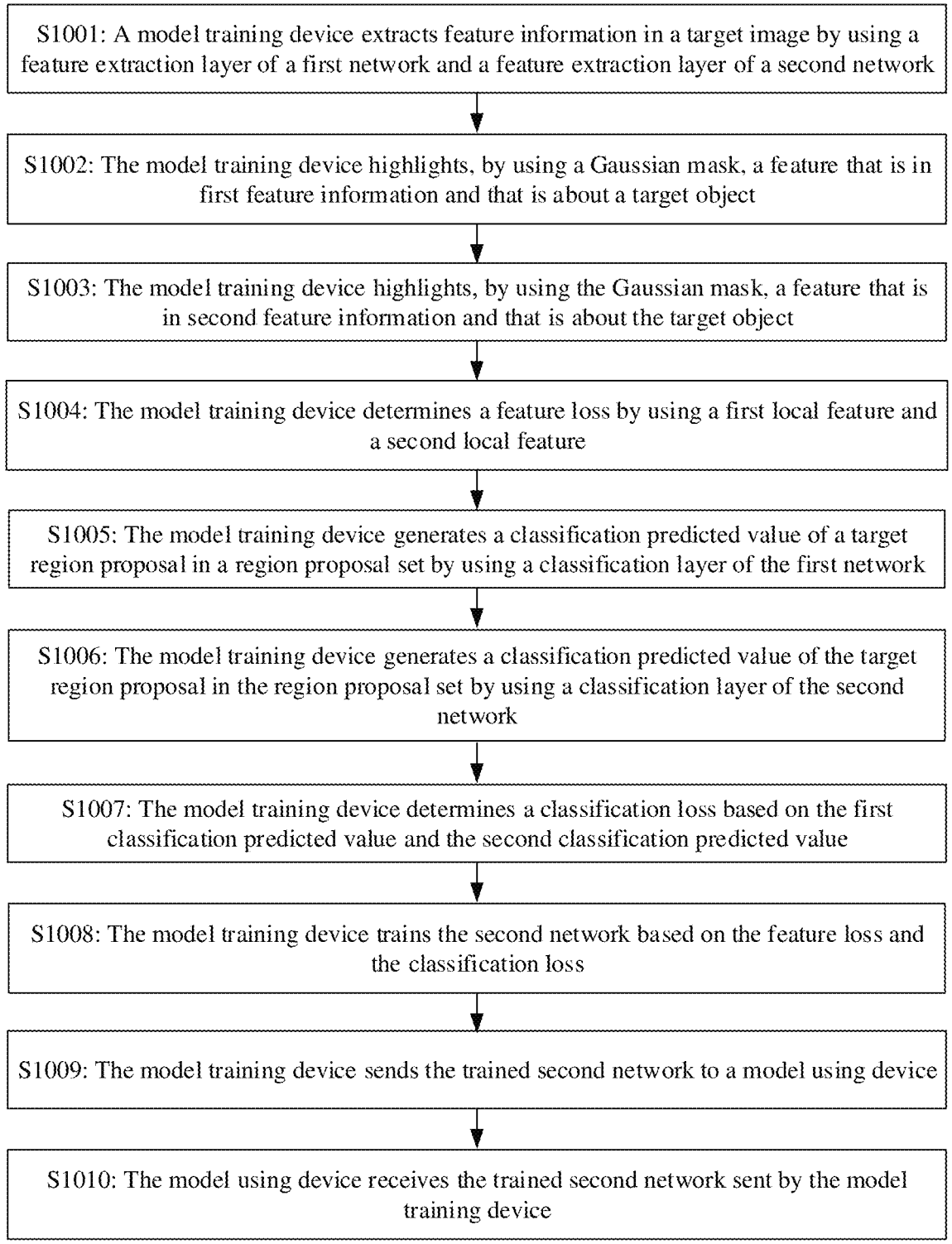
FIG. 10 is a schematic flowchart of a model training method according to an embodiment of this application.

FIG. 10 is a schematic flowchart of a model training method according to an embodiment of this application. The method may be implemented based on a model training system shown in FIG. 6. The method includes but is not limited to the following steps.

Step S1001: A model training device separately extracts feature information in a target image by using a feature extraction layer of a first network and a feature extraction layer of a second network.

Specifically, the first network is used as a teacher network, and the second network is used as a student network. In a process in which the first network guides training of the second network, that is, in a model distillation process, the feature extraction layer of the first network and the feature extraction layer of the second network extract feature information for a same image. For ease of description, the same image may be referred to as the target image.

Optionally, a layer of the first network is greater than a layer of the second network. For example, the first network may be a 101-layer (res101) neural network, and the second network may be a 50-layer (res50) neural network.

The feature information in this embodiment may be represented by using a vector, or may be represented in another machine-recognizable manner.

Step S1002: The model training device highlights, by using a Gaussian mask, a feature that is in first feature information and that is about the target object.

The inventor of this application finds that in a neural network-based target object detection (that is, recognition) process, a gain of detection performance mainly comes from feature information extracted by using a feature extraction layer (backbone layer). Therefore, simulation of the feature extraction layer is an important part of model training. In this embodiment, introducing the Gaussian mask is actually a process of highlighting a feature of the target object in the target image and suppressing a feature of a background other than the target object. Actually, it is also a process of highlighting a response to the target object and weakening edge information. It should be noted that, in a manner in which the Gaussian mask is used, not only a feature of a background outside a rectangular viewfinder frame (usually a minimum rectangular viewfinder frame outside the target object) in which the target object is located can be suppressed, but also a feature of a background other than the target object inside the rectangular viewfinder frame can be suppressed. Therefore, the feature of the target object is highlighted to a maximum extent.

Figure 11:
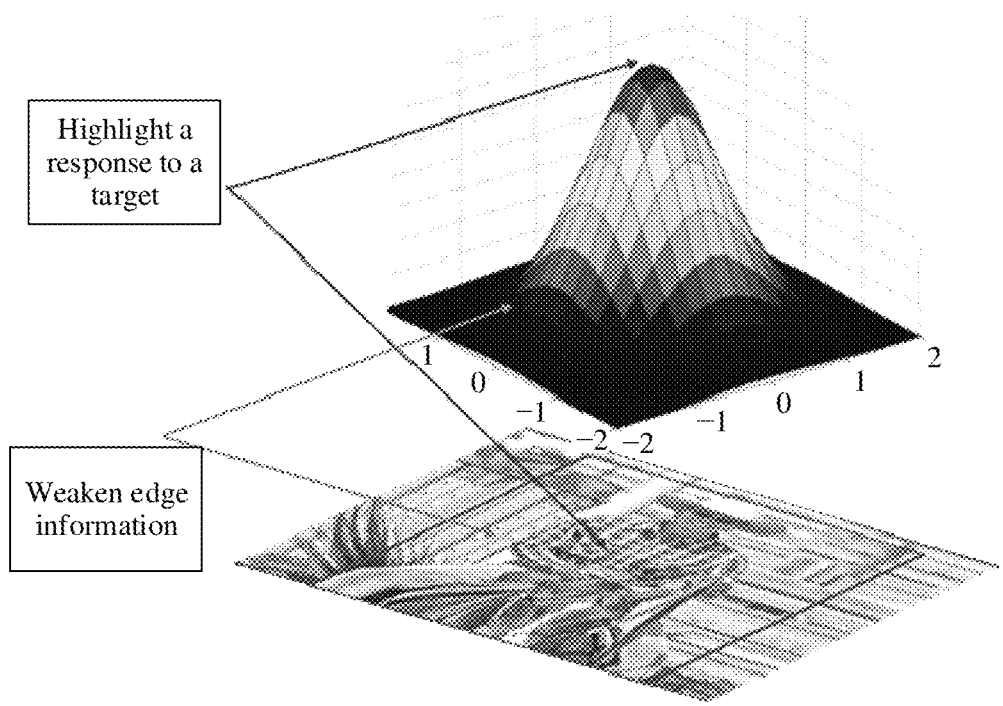
FIG. 11 is a schematic principle diagram of a Gaussian mask according to an embodiment of this application.

As shown in FIG. 11, a person (namely, a target object) in a target image may be highlighted by using the Gaussian mask, and a feature of a background other than the person is weakened. In model data of the Gaussian mask, feature information corresponding to the target object forms a large protrusion in coordinates, and a height of information about the background in the coordinates is close to zero, which is approximately on a plane with a height of zero.

For ease of understanding, the following uses an example to definite the Gaussian mask for the target image, which is specifically shown in formula 1-1:

$$M(x, y) = \begin{cases} e^{-\frac{(x-x_0)^2}{\sigma_x(w/2)^2} - \frac{(y-y_0)^2}{\sigma_y(h/2)^2}}, & (x, y) \in B \\ 0 & \text{otherwise} \end{cases} \quad \text{formula 1-1}$$

In formula 1-1, (x,y) is coordinates of a pixel in the target image, B is a positive region proposal of the target object in the target image, a geometric specification of the positive region proposal B is w×h, coordinates of a center point of the positive region proposal B are $(x_0, y_0)$, and $\sigma_x$ and $\sigma_y$ are attenuation factors on an x axis and a y axis respectively. Optionally, for convenience, $\sigma_x = \sigma_y$ may be set. The Gaussian mask is valid only for a target ground truth viewfinder frame, and all backgrounds outside the viewfinder frame are filtered out. When there is a plurality of positive region proposals about the target object, a pixel (x,y) in the target object may have a plurality of Gaussian mask values (respectively corresponding to different positive region proposals). In this case, a maximum value of the plurality of Gaussian mask values may be selected as a Gaussian mask value M(x,y) of the pixel (x,y), and the Gaussian mask value M(x,y) may be represented according to formula 1-2:

$$M(x,y)=\max\{M^1(x,y), M^2(x,y), \ldots, M^{N_p}(x,y), M^{N_p}(x,y)\} \quad \text{formula 1-2.}$$

In formula 1-2, $N_p$ is a quantity of positive region proposals of the target object in the target image, $M^1(x,y)$ is a Gaussian mask value of a midpoint (x,y) in a first positive region proposal, $M^2(x,y)$ is a Gaussian mask value of a midpoint (x,y) in a second positive region proposal, $M^{N_p}(x,y)$ is a Gaussian mask value of a midpoint (x,y) in an $N_p^{th}$ positive region proposal, and the rest can be deduced by analogy. It can be learned from formula 1-2 that the Gaussian mask value of the pixel (x,y) in the target object is the maximum value in the plurality of values.

For ease of description, the feature information that is extracted by using the feature extraction layer of the first network and that is in the target image is referred to as the first feature information, and the feature, highlighted by using the Gaussian mask, that is in the first feature information and that is about the target object is referred to as a first local feature.

Step S1003: The model training device highlights, by using the Gaussian mask, a feature that is in second feature information and that is about the target object.

For ease of description, the feature information that is extracted by using the feature extraction layer of the second network and that is in the target image is referred to as the second feature information, and the feature, highlighted by using the Gaussian mask, that is in the second feature information and that is about the target object is referred to as a second local feature.

Step S1004: The model training device determines a feature loss by using the first local feature and the second local feature.

In this embodiment, the first local feature is a feature that is obtained by the first network and that is for the target object in the target image, and the second local feature is a feature that is obtained by the second network and that is for the target object in the target image. A difference between the first local feature and the second local feature can reflect a difference between the feature extraction layer of the first network and the feature extraction layer of the second network. The feature loss (also referred to as a distillation loss) in this embodiment can reflect a difference between the second local feature and the first local feature.

Optionally, the first local feature may be represented as $M^{ij}*(F_t^{ijc})$ the second local feature may be represented as $M^{ij}*(F_s^{ijc})$ and the feature loss $L_b$ may be calculated according to formula 1-3:

$$L_b = \frac{1}{A}\sum_{i=1}^{W}\sum_{j=1}^{H}\sum_{c=1}^{C} M^{ij} * (F_s^{ijc} - F_t^{ijc})^2. \quad \text{formula 1-3}$$

In this embodiment, $$A = \sum_{i=1}^{W}\sum_{j=1}^{H} M^{ij},$$

where A is introduced to implement a normalization operation. A specification of the target image is W×H, $M^{ij}$ represents a Gaussian mask value of a pixel in the target image, i may be set from 1 to W, j may be a value from 1 to H, and the Gaussian mask value $M^{ij}$ of any pixel (i,j) in the target image may be obtained through calculation according to the foregoing formula 1-1 and formula 1-2. Details are not described herein again. In addition, $F_s^{ijc}$ represents a feature of a pixel (i,j) extracted by the second network, $F_t^{ijc}$ represents a feature of a pixel (i,j) extracted by the first network, and C represents a quantity of channels of a feature map when the feature information in the target image is extracted by the first network and the second network.

Step S1005: The model training device generates a classification predicted value of a target region proposal in a region proposal set by using a classification layer of the first network.

Figure 12:
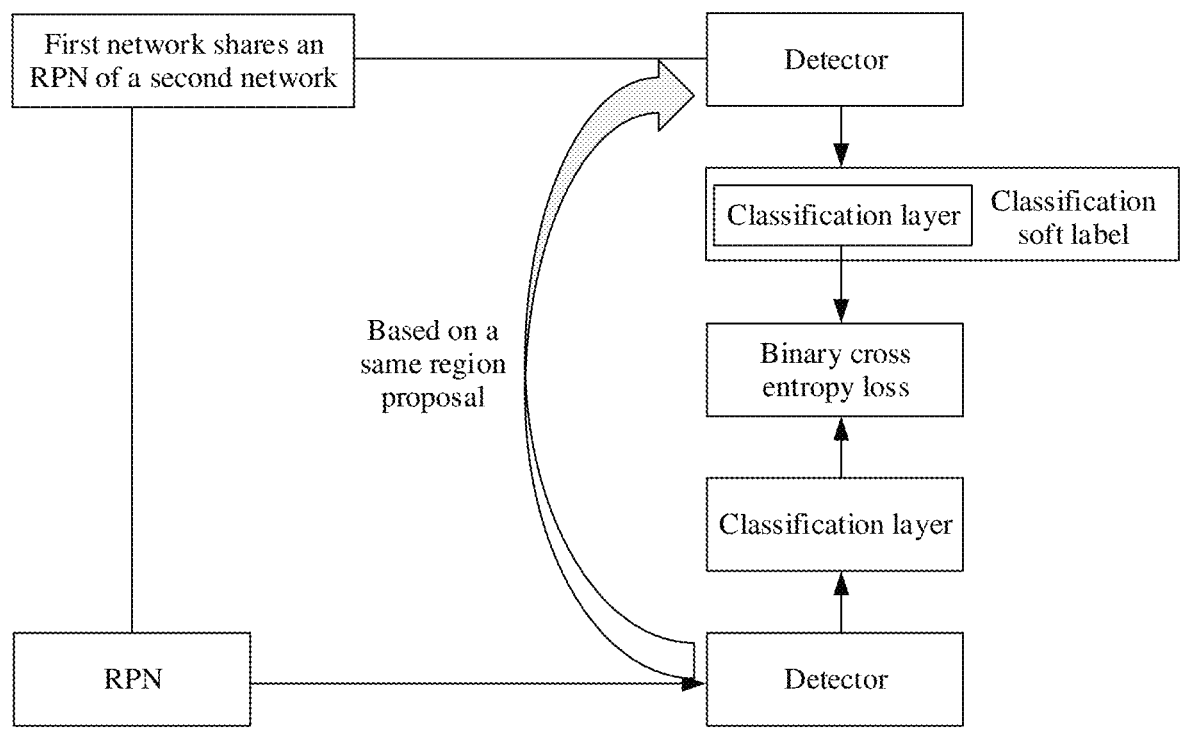
FIG. 12 is a schematic diagram of still another model distillation scenario according to an embodiment of this application.

Specifically, a corresponding algorithm or policy may be used to ensure that both the first network and the second network have the region proposal set. For example, the first network and the second network share an RPN. In this way, both the first network and the second network have the region proposal set. For example, the shared RPN may include 2000 region proposals, and the region proposal set includes 512 of the 2000 region proposals. A same detector may be configured in the first network and the second network, so that the first network and the second network can extract the same 512 region proposals, that is, the region proposal set, from the 2000 shared region proposals. FIG. 12 is a schematic flowchart of enabling the first network and the second network to select a same region proposal by sharing the RPN and configuring the same detector. All selected region proposals are collectively referred to as the region proposal set.

The RPN is an RPN shared by the first network and the second network, and may be shared by the second network with the first network, may be shared by the first network with the second network, or may be shared in another manner.

In an optional solution, the target region proposal is all region proposals in the region proposal set, that is, includes positive region proposals of the target object and negative example region proposals of the target object. Optionally, the positive region proposals and the negative example region proposals in the region proposal set may be manually pre-marked, or may be automatically marked by a machine. A common division criterion is: If an overlapping degree between a region proposed and a rectangular viewfinder frame (usually a minimum rectangular viewfinder frame outside the target object) in which the target object is located exceeds a specified reference threshold (for example, may be set to 50% or another value), the region proposal may be classified as the positive region proposal of the target object. Otherwise, the region proposal is classified as the negative example region proposal of the target object.

In still another optional solution, the target region proposal is a positive region proposal that is in the region proposal set and that belongs to the target object.

In this embodiment, for ease of subsequent description, the classification predicted value that is generated by using the classification layer of the first network and that is of the target region proposal in the region proposal set may be referred to as a first classification predicted value.

Step S1006: The model training device generates a classification predicted value of the target region proposal in the region proposal set by using a classification layer of the second network.

In this embodiment, for ease of subsequent description, the classification predicted value that is generated by using the classification layer of the second network and that is of the target region proposal in the region proposal set may be referred to as a second classification predicted value.

Both the first classification predicted value and the second classification predicted value are used to represent classification tendencies or probabilities of corresponding region proposals. For example, a classification predicted value of a region proposal 1 generated by a classification label of the first network represents that a probability that an object in the region proposal 1 is classified as a person is 0.8, a probability that the object is classified as a tree is 0.3, and a probability that the object is classified as a vehicle is 0.1. It should be noted that classification predicted values obtained by classification layers in different networks by performing classification on a same region proposal may be different. Because model parameters of different networks are usually different, prediction capabilities of the networks are usually different.

Step S1007: The model training device determines a classification loss based on the first classification predicted value and the second classification predicted value.

Specifically, in this embodiment, the same region proposal set is selected, so that the classification layer of the first network and the classification layer of the second network generate the classification predicted values based on the same region proposal. When region proposals are the same, a difference between the predicted values generated by the two networks is usually caused by a difference between model parameters of the two networks. Therefore, in this embodiment, the classification loss used to train the second network is determined based on a difference between the first predicted value and the second predicted value. Actually, the first predicted value is used as a soft label to determine the classification loss of the classification layer of the second network. In this manner, a loss of the second network relative to the first network can be minimized, and therefore model training effect is good.

In an optional solution, the classification loss meets a relationship shown in formula 1-4:

$$L_{cls} = \sum_{m=1}^{K} L_{CE}(y_s^m, y^m) + \beta \sum_{n=1}^{N_p} L_{BCE}(y_s^n, y_t^n).\qquad \text{formula 1-4}$$

In formula 1-4, K is a total quantity of region proposals in the region proposal set, $N_p$ is a total quantity of positive region proposals that are in the region proposal set and that belong to the target object, $y_s^m$ is a classification predicted value predicted by the classification layer of the second network for an $m^{th}$ region proposal in the region proposal set, $y^m$ is a ground truth label corresponding to the $m^{th}$ region proposal in the region proposal set, $y_s^n$ is the second classification predicted value predicted by the classification layer of the second network for an $n^{th}$ positive region proposal that is in the region proposal set and that belongs to the target object, $y_t^n$ is the first classification predicted value predicted by the classification layer of the first network for the $n^{th}$ positive region proposal that is in the region proposal set and that belongs to the target object, $L_{CE}(y_s^m, y^m)$ represents a cross entropy loss obtained based on $y_s^m$ and $y^m$, $L_{BCE}(y_s^n, y_t^n)$ represents a binary cross entropy loss obtained based on $y_s^n$ and $y_t^n$, and β is a preset weight balance factor.

Step S1008: The model training device trains the second network based on the feature loss and the classification loss to obtain a target network.

A meaning of training the second network based on the feature loss and the classification loss to obtain the target network mentioned in this embodiment is: The target network is obtained by training the second network, and a parameter used in a training process includes but is not limited to the feature loss and the classification loss, that is, another parameter other than the two parameters may be used. In addition, in the training process, only the feature loss and the classification loss that are obtained based on the first network may be used (that is, the target network is obtained by distilling the second network based on the first network). Alternatively, not only the feature loss and the classification loss that are obtained based on the first network are used, but also information obtained based on another network (one or more) (that is, the target network is obtained by distilling the second network based on the first network and the another network) is used.

Optionally, in the process of training the second network based on the feature loss and the classification loss, a total loss L may be determined based on the feature loss $L_b$ and the classification loss $L_{cls}$, and then the second network is trained based on the total loss. Optionally, some model parameters (for example, model parameters of the feature extraction layer) in the second network may be trained based on the feature loss, and still some model parameters (for example, model parameters of the classification layer) in the second network may be trained by using the classification loss. Certainly, the second network may be trained in another manner based on the feature loss and the classification loss.

When the second network is trained based on the total loss L, the following uses two optional cases of calculating the total loss as examples.

Case 1: The total loss L is calculated according to formula 1-5:

$$L=\delta L_b+L_{cls} \qquad \text{formula 1-5.}$$

In formula 1-5, δ is a preset or pre-trained weight balance factor.

Case 2: A regression loss and an RPN loss of the second network are determined based on the ground truth label of the region proposal in the target image and the predicted value predicted by the second network for the region proposal in the target image. To be specific, the second network obtains the regression loss $L_{reg}$ and the RPN loss $L_{rpn}$ through training without depending on the first network, and then obtains the total loss L with reference to the regression loss $L_{reg}$, the RPN loss $L_{rpn}$, the feature loss $L_b$, and the classification loss $L_{cls}$. Optionally, a calculation manner of the total loss L is shown in formula 1-6:

$$L=\delta L_b+L_{cls}+L_{reg}+L_{rpn} \qquad \text{formula 1-6.}$$

In this embodiment, determining the classification loss and determining the feature loss are not subject to a specific sequence. The classification loss and the feature loss may be simultaneously determined, the classification loss may be determined first, or the feature loss may be determined first.

In an optional solution, the model training device trains the second network based on the feature loss and the classification loss to obtain an intermediate network instead of the final target network, and subsequently trains the intermediate network by using another network (for example, a third network). This process may be considered as performing progressive distillation on the second network. A principle is as follows: After the intermediate network is obtained by distilling the second network based on the first network (that is, obtaining the feature loss and the classification loss based on the first network and the second network, and then training the second network based on the feature loss and the classification loss), the intermediate network may be further distilled for another time by using the third network with more layers than the first network. A principle of distilling the intermediate network by using the third network is the same as a principle of distilling the second network by using the first network. Subsequently, a network with a large quantity of layers may be used to further distil a newly trained network, until the distillation of the second network reaches an expected target, so that the target network is obtained.

For example, if the first network 701 is the 101-layer (res101) neural network, and the second network 702 is the 50-layer (res50) neural network, after the second network 702 is distilled by using the first network 701 based on the foregoing technical points 1 and/or 2 to obtain an intermediate neural network (which may be denoted as res101-50), the intermediate neural network (res101-50) is further distilled by using the third neural network (that is, the second network 702 is sequentially distilled by using the first network 701 and the third network). The principle of distilling the intermediate neural network by using the third neural network is the same as the principle of distilling the second network 702 by using the first network 701. Details are not described herein again. The third neural network is a neural network larger than the first network 701, for example, a 152-layer (res152) neural network.

It should be noted that, in the method embodiment shown in FIG. 10, one, two, or three of the foregoing three technical points may be used. For example, the technical point of the progressive distillation (the first of the foregoing three technical points) may be used, but for how to specifically extract the feature, and how to specifically use the region proposal is not specially limited (that is, whether the second and the third in the foregoing three technical points are used is not limited).

Step S1009: The model training device sends the target network to a model using device.

Step S1010: The model using device receives the target network sent by the model training device.

Specifically, after receiving the target network, the model using device predicts (or detects, or estimates) content in an image (that is, recognizes a target in the image) by using the target network, for example, recognizes whether a face exists in the image, and a specific location of the face in the image when the face exists; recognizes whether a road obstacle exists in the image, and a location of the obstacle in the image when the obstacle exists; or the like. For a specific use scenario, refer to the description of the model using device 602 in the architecture shown in FIG. 6.

To verify effect of the foregoing embodiment, the inventor of this application performs verification on two standard detection datasets. The two detection datasets are a COCO2017 dataset and a BDD100k dataset. The COCO dataset includes 80 object categories, 110,000 training images, and 5,000 verification images. The BDD100k dataset includes 10 categories and 100,000 images in total. Both datasets are evaluated by using a COCO evaluation standard, that is, category mean average precision (mAP).

Table 1 shows different distillation policy solutions. Networks (or models) whose layers are res18, res50, res101, and res152 have been pre-trained on the COCO dataset, and only need to be distilled by using the foregoing embodiment.

TABLE 1

Different distillation policies

| Policy number | Teacher network | Student network | Distilled student network |
| --- | --- | --- | --- |
| 1 | res50 | res18 | res50-18 |
| 2 | res101 | res 18 | res101-18 |
| 3 | res101 | res50-18 | res101-50-18 |
| 4 | res152 | res101-50-18 | res152-101-50-18 |

In Table 1, res50-18 represents a network obtained after an 18-layer network is distilled by using a 50-layer network; res101-18 represents a network obtained after the 18-layer network is distilled by using a 101-layer network; res101-50-18 represents a network obtained by further distilling, by using the 101-layer network, the network res101-18 obtained through distillation; and res152-101-50-18 represents a network obtained by further distilling, by using a 152-layer network, the network res101-50-18 obtained through distillation. Optionally, the network res50 may be considered as the first network, the network res18 may be considered as the second network, the network 101 may be considered as the third network, the network res152 may be considered as the fourth network, and the fourth network is a network with more layers than the third network. The network res152-101-50-18 obtained after the second network is successively distilled by using the first network, the third network, and the fourth network may be sent to the model using device to detect the target in the image.

Table 2 shows evaluation results of different networks on the COCO dataset. Detection precision of the network res50-18 is significantly improved by 2.8% compared with detection precision of the original network res18, and detection precision of the network res101-18 is improved by 3.2% compared with the detection precision of the network res18. The network res101-50-18 obtained by using a progressive distillation method is further improved compared with the network re50-18 obtained through single distillation. It is worth mentioning that detection precision of the network res152-101-50-18 is greatly improved by 4.4% compared with the detection precision of the network res18, and distilled mAP reaches 0.366, which is higher than detection precision 0.364 of the network res50. In other words, although the network res18 has fewer network layers than the network res50, and a great difference between original mAP and the distilled mAP is 4.2%, the method in this embodiment performs progressive distillation on the network res18, so that performance of the distilled network res18 exceeds performance of the network res50.

TABLE 2

Performance evaluation results of different networks on the COCO dataset

| Network | mAP | AP 50 | AP 75 | Aps (small) | Apm (medium) | Apl (large) |
| --- | --- | --- | --- | --- | --- | --- |
| res18 | 0.322 | 0.534 | 0.34 | 0.183 | 0.354 | 0.411 |
| res50 | 0.364 | 0.581 | 0.393 | 0.216 | 0.398 | 0.468 |
| res101 | 0.385 | 0.602 | 0.417 | 0.225 | 0.429 | 0.492 |
| res152 | 0.409 | 0.622 | 0.448 | 0.241 | 0.453 | 0.532 |
| res50-18 | 0.35 | 0.56 | 0.373 | 0.187 | 0.384 | 0.459 |

TABLE 2-continued

Performance evaluation results of
different networks on the COCO dataset

| Network | mAP | AP 50 | AP 75 | Aps (small) | Apm (medium) | Apl (large) |
|---|---|---|---|---|---|---|
| res101-18 | 0.354 | 0.563 | 0.38 | 0.186 | 0.387 | 0.473 |
| res101-50-18 | 0.358 | 0.567 | 0.387 | 0.184 | 0.392 | 0.479 |
| res152-101-50-18 | 0.366 | 0.574 | 0.396 | 0.184 | 0.399 | 0.5 |

In Table 2, the mAP is the mean average precision, AP 50 is a precision average when intersection over union (IOU) is greater than 0.5, AP 75 is a precision average when the IOU is greater than 0.75, Aps is a precision average of a small object, Apm is a precision average of a medium object, and Apl is a precision average of a large object.

As shown in Table 3, the network res50 and the network res101 are used as teacher networks, and the network res18 is used as a student network. +1 represents that only the first technical point is used (that is, the Gaussian mask is used to highlight the target object), +2 represents that the second technical point is used (that is, the same region proposal set is selected), and +3 represents that the third technical point is used (that is, the progressive distillation). Student networks res18 in a network res18 (+1) and a network res18 (+1+2) are not pre-trained on the COCO dataset, and the student network res18 in a network res18 (+1+2+3) is pre-trained on the COCO dataset. This is beneficial to shorten a difference distance between the student network and the teacher network, which is equivalent to a scheme of progressive distillation. It can be seen that with continuous improvement, distillation effect is gradually improved, which also proves the effectiveness of the foregoing three technical points.

TABLE 3

Experimental effect of each technical point

| | res18 | res18 (+1) | res18 (+1 + 2) | res18 (+1 + 2 + 3) |
|---|---|---|---|---|
| Teacher network res50 | 0.322 | 0.342 | 0.344 | 0.35 |
| Teacher network res101 | 0.322 | 0.347 | 0.349 | 0.354 |

To verify applicability of this application to different data, a comparison experiment is also performed on the BDD100k dataset, and a result is shown in Table 4. There is an mAP (precision) difference of 2.1% between the original network res18 (used as the student network) and the network res50 (used as the teacher network). After distillation is performed by using the method in this embodiment, the detection mAP (precision) of the network res50-18 obtained through distillation is improved by 1.5% compared with the detection mAP (precision) of the original network res18, and is only 0.6% lower than the detection mAP (precision) of the teacher network res50. This makes up for an mAP (precision) gap of nearly 75%, and the distillation effect is obvious.

TABLE 4

Performance evaluation results on the BDD100k dataset

| Network | mAP | AP 50 | AP 75 | Aps | Apm | Apl |
|---|---|---|---|---|---|---|
| res18 | 0.321 | 0.619 | 0.289 | 0.159 | 0.374 | 0.513 |
| res50 | 0.342 | 0.644 | 0.314 | 0.171 | 0.399 | 0.546 |
| res50-18 | 0.336 | 0.636 | 0.309 | 0.166 | 0.393 | 0.539 |

In the method described in FIG. 10, the Gaussian mask is used to highlight the local feature that is in the feature information extracted by the first network and that is about the target object, and highlight the local feature that is in the feature information extracted by the second network and that is about the target object. Then, the feature loss is determined based on the local features that are in the two networks and that are about the target object, and the second network is subsequently trained based on the feature loss. Background noise (including background noise outside the viewfinder frame of the target object and background noise inside the viewfinder frame of the target object) of the image is filtered out by using the Gaussian mask. The resulting feature loss can better reflect a difference between the second network and the first network. Therefore, training the second network based on the feature loss can enable expression of a feature by the second network to approximate expression of a feature by the first network, and model distillation effect is good.

Further, the same region proposal set is selected, so that the classification layer of the first network and the classification layer of the second network generate the classification predicted values based on the same region proposal. When region proposals are the same, a difference between the predicted values generated by the two networks is usually caused by a difference between model parameters of the two networks. Therefore, in this embodiment, the classification loss used to train the second network is determined based on a difference between the first predicted value and the second predicted value. In this manner, the loss of the second network relative to the first network can be minimized. Therefore, training the second model based on the classification loss can enable a classification result of the second network to approximate a classification result of the first network, and the model distillation effect is good.

Further, after the second network is trained by using the first network, the third network with more layers is further used to further train the trained second network, so that performance of the second network can be stably improved.

The method in embodiments of this application is described above in detail, and an apparatus in embodiments of this application is provided below.

Figure 13:
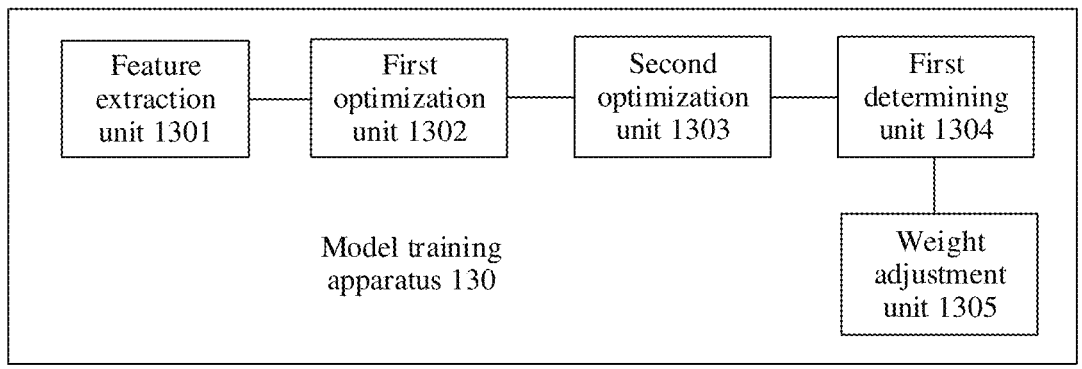
FIG. 13 is a schematic diagram of a structure of a model training apparatus according to an embodiment of this application.

FIG. 13 is a schematic diagram of a structure of a model training apparatus 130 according to an embodiment of this application. The model training apparatus 130 may be the model training device in the foregoing method embodiment or a component in the model training device. The model training apparatus 130 may include a feature extraction unit 1301, a first optimization unit 1302, a second optimization unit 1303, a first determining unit 1304, and a weight adjustment unit 1305. Detailed description of the units is as follows.

The feature extraction unit 1301 is configured to extract first feature information in a target image by using a feature extraction layer of a first network.

The feature extraction unit 1301 is further configured to extract second feature information in the target image by using a feature extraction layer of a second network, where both the first network and the second network are classification networks, and a depth of the first network is greater than a depth of the second network.

The first optimization unit 1302 is configured to extract a feature that is in the first feature information and that is about a target object by using a Gaussian mask to obtain a first local feature.

The second optimization unit 1303 is configured to extract a feature that is in the second feature information and that is about the target object by using the Gaussian mask to obtain a second local feature.

The first determining unit 1304 is configured to determine a feature loss by using the first local feature and the second local feature.

The weight adjustment unit 1305 is configured to train the second network based on the feature loss to obtain a target network.

In the foregoing method, the Gaussian mask is used to highlight the local feature that is in the feature information extracted by the first network and that is about the target object, and highlight the local feature that is in the feature information extracted by the second network and that is about the target object. Then, the feature loss is determined based on the local features that are in the two networks and that are about the target object, and the second network is subsequently trained based on the feature loss. Background noise (including background noise outside a viewfinder frame of the target object and background noise inside the viewfinder frame of the target object) of the image is filtered out by using the Gaussian mask. The resulting feature loss can better reflect a difference between the second network and the first network. Therefore, training the second network based on the feature loss can enable expression of a feature by the second network to approximate expression of a feature by the first network, and model distillation effect is good.

In a possible implementation, the apparatus further includes:
a first generation unit, configured to generate a first classification predicted value of a target region proposal in a region proposal set by using a classification layer of the first network;
a second generation unit, configured to generate a second classification predicted value of the target region proposal in the region proposal set by using a classification layer of the second network; and
a second determining unit, configured to determine a classification loss based on the first classification predicted value and the second classification predicted value, where
the weight adjustment unit is specifically configured to train the second network based on the feature loss and the classification loss to obtain the target network.

In this possible implementation, the same region proposal set is selected, so that the classification layer of the first network and the classification layer of the second network generate the classification predicted values based on the same region proposal. When region proposals are the same, a difference between the predicted values generated by the two networks is usually caused by a difference between model parameters of the two networks. Therefore, in this embodiment, the classification loss used to train the second network is determined based on a difference between the first predicted value and the second predicted value. In this manner, a loss of the second network relative to the first network can be minimized. Therefore, training the second model based on the classification loss can enable a classification result of the second network to approximate a classification result of the first network, and the model distillation effect is good.

In a possible implementation, when the second network is trained based on the feature loss to obtain the target network, the weight adjustment unit is specifically configured to:
train the second network based on the feature loss; and
train the trained second network by using a third network to obtain the target network, where a depth of the third network is greater than the depth of the first network.

In this possible implementation, after the second network is trained by using the first network, the third network with more layers is further used to further train the trained second network, so that performance of the second network can be stably improved.

In a possible implementation, both the first network and the second network have the region proposal set by sharing a region proposal network (RPN) between the first network and the second network.

In a possible implementation, the RPN is shared by the second network with the first network, or is shared by the first network with the second network.

In a possible implementation, the target region proposal is all region proposals in the region proposal set, or is a positive region proposal that is in the region proposal set and that belongs to the target object.

In a possible implementation, the classification loss $L_{cls}$ meets the following relationship:

$$L_{cls} = \sum_{m=1}^{K} L_{CE}(y_s^m, y^m) + \beta \sum_{n=1}^{N_p} L_{BCE}(y_s^n, y_t^n).$$

K is a total quantity of region proposals in the region proposal set, $N_p$ is a total quantity of positive region proposals that are in the region proposal set and that belong to the target object, $y_s^m$ is a classification predicted value predicted by the classification layer of the second network for an $m^{th}$ region proposal in the region proposal set, $y^m$ is a ground truth label corresponding to the $m^{th}$ region proposal in the region proposal set, $y_s^n$ is the second classification predicted value predicted by the classification layer of the second network for an $n^{th}$ positive region proposal that is in the region proposal set and that belongs to the target object, $y_t^n$ is the first classification predicted value predicted by the classification layer of the first network for the $n^{th}$ positive region proposal that is in the region proposal set and that belongs to the target object, $L_{CE}(y_s^m, y^m)$ represents a cross entropy loss obtained based on $y_s^m$ and $y^m$, $L_{BCE}(y_s^n, y_t^n)$ represents a binary cross entropy loss obtained based on $y_s^n$ and $y_t^n$, and $\beta$ is a preset weight balance factor.

In a possible implementation, the apparatus further includes:
a third determining unit, configured to determine a regression loss and an RPN loss of the second network based on a ground truth label of a region proposal in the target image and a predicted value predicted by the second network for the region proposal in the target image, where
the weight adjustment unit is specifically configured to train the second network based on the feature loss, the classification loss, the regression loss, and the RPN loss to obtain the target network.

In a possible implementation, the apparatus further includes:
a sending unit, configured to: after the weight adjustment unit trains the second network based on the feature loss to obtain the target network, send the target network to a model using device, where the target network is used to predict content in an image.

It should be noted that, for implementations and beneficial effect of the units, refer to corresponding description in the method embodiment shown in FIG. 10.

Figure 14:
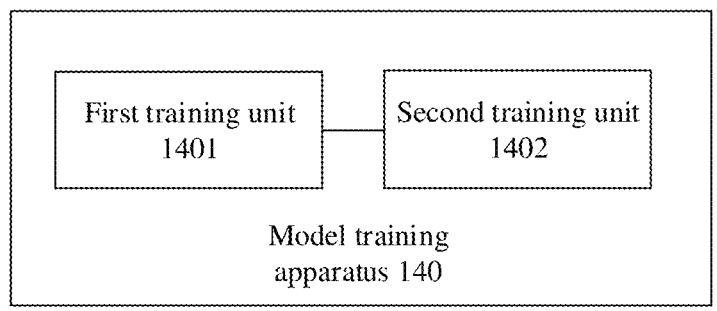
FIG. 14 is a schematic diagram of a structure of still another model training apparatus according to an embodiment of this application.

FIG. 14 is a schematic diagram of a structure of a model training apparatus 140 according to an embodiment of this application. The model training apparatus 140 may be the model training device in the foregoing method embodiment or a component in the model training device. The model training apparatus 140 may include a first training unit 1401 and a second training unit 1402. Detailed description of the units is as follows.

The first training unit 1401 is configured to train a second network based on a first network to obtain an intermediate network.

The second training unit 1402 is configured to train the intermediate network based on a third network to obtain a target network, where all the first network, the second network, and the third network are classification networks, a depth of the third network is greater than a depth of the first network, and the depth of the first network is greater than a depth of the second network.

In the foregoing method, after the second network is trained by using the first network, the third network with more layers is further used to further train the trained second network, so that performance of the second network can be stably improved.

In a possible implementation, the training a second network based on a first network to obtain an intermediate network includes:

extracting first feature information in a target image by using a feature extraction layer of the first network;

extracting second feature information in the target image by using a feature extraction layer of the second network;

extracting a feature that is in the first feature information and that is about a target object by using a Gaussian mask to obtain a first local feature;

extracting a feature that is in the second feature information and that is about the target object by using the Gaussian mask to obtain a second local feature;

determining a feature loss by using the first local feature and the second local feature; and training the second network based on the feature loss to obtain the intermediate network.

In this possible implementation, the Gaussian mask is used to highlight the local feature that is in the feature information extracted by the first network and that is about the target object, and highlight the local feature that is in the feature information extracted by the second network and that is about the target object. Then, the feature loss is determined based on the local features that are in the two networks and that are about the target object, and the second network is subsequently trained based on the feature loss. Background noise (including background noise outside a viewfinder frame of the target object and background noise inside the viewfinder frame of the target object) of the image is filtered out by using the Gaussian mask. The resulting feature loss can better reflect a difference between the second network and the first network. Therefore, training the second network based on the feature loss can enable expression of a feature by the second network to approximate expression of a feature by the first network, and model distillation effect is good.

In a possible implementation, the apparatus further includes:

a first generation unit, configured to generate a first classification predicted value of a target region proposal in a region proposal set by using a classification layer of the first network;

a second generation unit, configured to generate a second classification predicted value of the target region proposal in the region proposal set by using a classification layer of the second network; and a second determining unit, configured to determine a classification loss based on the first classification predicted value and the second classification predicted value.

The training the second network based on the feature loss to obtain the intermediate network is specifically:

training the second network based on the feature loss and the classification loss to obtain the intermediate network.

In this possible implementation, the same region proposal set is selected, so that the classification layer of the first network and the classification layer of the second network generate the classification predicted values based on the same region proposal. When region proposals are the same, a difference between the predicted values generated by the two networks is usually caused by a difference between model parameters of the two networks. Therefore, in this embodiment, the classification loss used to train the second network is determined based on a difference between the first predicted value and the second predicted value. In this manner, a loss of the second network relative to the first network can be minimized. Therefore, training the second model based on the classification loss can enable a classification result of the second network to approximate a classification result of the first network, and the model distillation effect is good.

In a possible implementation, both the first network and the second network have the region proposal set by sharing a region proposal network (RPN) between the first network and the second network.

In a possible implementation, the RPN is shared by the second network with the first network, or is shared by the first network with the second network.

In a possible implementation, the target region proposal is all region proposals in the region proposal set, or is a positive region proposal that is in the region proposal set and that belongs to the target object.

In a possible implementation, the classification loss $L_{cls}$ meets the following relationship:

$$L_{cls} = \sum_{m=1}^{K} L_{CE}(y_s^m, y^m) + \beta \sum_{n=1}^{N_p} L_{BCE}(y_s^n, y_t^n).$$

K is a total quantity of region proposals in the region proposal set, $N_p$ is a total quantity of positive region proposals that are in the region proposal set and that belong to the target object, $y_s^m$ is a classification predicted value predicted by the classification layer of the second network for an $m^{th}$ region proposal in the region proposal set, $y^m$ is a ground truth label corresponding to the $m^{th}$ region proposal in the region proposal set, $y_s^n$ is the second classification predicted value predicted by the classification layer of the second network for an $n^{th}$ positive region proposal that is in the region proposal set and that belongs to the target object, $y_t^n$ is the first classification predicted value predicted by the classification layer of the first network for the $n^{th}$ positive region proposal that is in the region proposal set and that belongs to the target object, $L_{CE}(y_s^m, y^m)$ represents a cross entropy loss obtained based on $y_s^m$ and $y^m$, $L_{BCE}(y_s^n, y_t^n)$ represents a binary cross entropy loss obtained based on $y_s^n$ and $y_t^n$, and $\beta$ is a preset weight balance factor.

In a possible implementation, the apparatus further includes:
 a third determining unit, configured to determine a regression loss and an RPN loss of the second network based on a ground truth label of a region proposal in the target image and a predicted value predicted by the second network for the region proposal in the target image, where
 the weight adjustment unit is specifically configured to train the second network based on the feature loss, the classification loss, the regression loss, and the RPN loss to obtain the target network.

In a possible implementation, the apparatus further includes:
 a sending unit, configured to: after the weight adjustment unit trains the second network based on the feature loss to obtain the target network, send the target network to a model using device, where the target network is used to predict content in an image.

It should be noted that, for implementations and beneficial effect of the units, refer to corresponding description in the method embodiment shown in FIG. 10.

Figure 15:
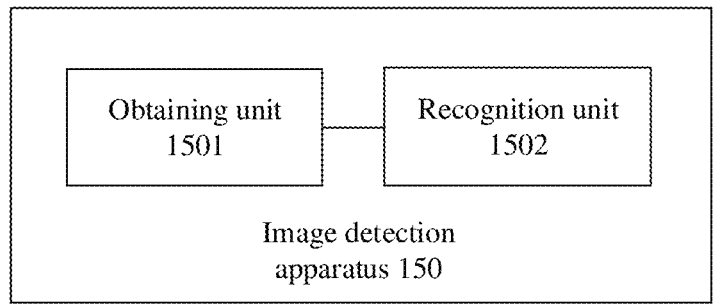
FIG. 15 is a schematic diagram of a structure of an image detection apparatus according to an embodiment of this application.

FIG. 15 is a schematic diagram of a structure of an image detection apparatus 150 according to an embodiment of this application. The image detection apparatus 150 may be the model using device in the foregoing method embodiment or a component in the model using device. The image detection apparatus 150 may include an obtaining unit 1501 and a recognition unit 1502. Detailed description of the units is as follows.

The obtaining unit 1501 is configured to obtain a target network, where the target network is a network obtained after a second network is trained by using a first network, a parameter used for training the second network by using the first network includes a feature loss, the feature loss is determined based on a first local feature and a second local feature, the first local feature is a feature that is extracted from first feature information by using a Gaussian mask and that is about a target object, the second local feature is a feature that is extracted from second feature information by using the Gaussian mask and that is about the target object, the first feature information is feature information that is extracted by using a feature extraction layer of the first network and that is in a target image, the second feature information is feature information that is extracted by using a feature extraction layer of the second network and that is in the target image, both the first network and the second network are classification networks, and a depth of the first network is greater than a depth of the second network.

The recognition unit 1502 is configured to recognize content in an image by using the target network.

In the foregoing method, the Gaussian mask is used to highlight the local feature that is in the feature information extracted by the first network and that is about the target object, and highlight the local feature that is in the feature information extracted by the second network and that is about the target object. Then, the feature loss is determined based on the local features that are in the two networks and that are about the target object, and the second network is subsequently trained based on the feature loss. Background noise (including background noise outside a viewfinder frame of the target object and background noise inside the viewfinder frame of the target object) of the image is filtered out by using the Gaussian mask. The resulting feature loss can better reflect a difference between the second network and the first network. Therefore, training the second network based on the feature loss can enable expression of a feature by the second network to approximate expression of a feature by the first network, and model distillation effect is good.

In a possible implementation, the parameter used for training the second network further includes a classification loss, the classification loss is determined based on a first classification predicted value and a second classification predicted value, the first classification predicted value is a classification predicted value that is generated by using a classification layer of the first network and that is of a target region proposal in a region proposal set, and the second classification predicted value is a classification predicted value that is generated by using a classification layer of the second network and that is of the target region proposal in the region proposal set.

In this possible implementation, the same region proposal set is selected, so that the classification layer of the first network and the classification layer of the second network generate the classification predicted values based on the same region proposal. When region proposals are the same, a difference between the predicted values generated by the two networks is usually caused by a difference between model parameters of the two networks. Therefore, in this embodiment, the classification loss used to train the second network is determined based on a difference between the first predicted value and the second predicted value. In this manner, a loss of the second network relative to the first network can be minimized. Therefore, training the second model based on the classification loss can enable a classification result of the second network to approximate a classification result of the first network, and the model distillation effect is good.

In a possible implementation, the target network is specifically a network that is obtained after the second network is trained by using the first network and that is further trained by using a third network, and a depth of the third network is greater than the depth of the first network.

In this possible implementation, after the second network is trained by using the first network, the third network with more layers is further used to further train the trained second network, so that performance of the second network can be stably improved.

In a possible implementation, both the first network and the second network have the region proposal set by sharing a region proposal network (RPN) between the first network and the second network.

In a possible implementation, the RPN is shared by the second network with the first network, or is shared by the first network with the second network.

In a possible implementation, the target region proposal is all region proposals in the region proposal set, or is a positive region proposal that is in the region proposal set and that belongs to the target object.

In a possible implementation, the classification loss $L_{cls}$ meets the following relationship:

$$L_{cls} = \sum_{m=1}^{K} L_{CE}(y_s^m, y^m) + \beta \sum_{n=1}^{N_p} L_{BCE}(y_s^n, y_t^n).$$

K is a total quantity of region proposals in the region proposal set, $N_p$ is a total quantity of positive region proposals that are in the region proposal set and that belong to the target object, $y_s^m$ is a classification predicted value predicted by the classification layer of the second network for an $m^{th}$ region proposal in the region proposal set, $y^m$ is a ground truth label corresponding to the $m^{th}$ region proposal in the region proposal set, $y_s^n$ is the second classification predicted value predicted by the classification layer of the second network for an $n^{th}$ positive region proposal that is in the region proposal set and that belongs to the target object, $y_t^n$ is the first classification predicted value predicted by the classification layer of the first network for the $n^{th}$ positive region proposal that is in the region proposal set and that belongs to the target object, $L_{CE}(y_s^m, y^m)$ represents a cross entropy loss obtained based on $y_s^m$ and $y^m$, $L_{BCE}(y_s^n, y_t^n)$ represents a binary cross entropy loss obtained based on $y_s^n$ and $y_t^n$, and β is a preset weight balance factor.

In a possible implementation, the parameter used for training the second network further includes a regression loss and an RPN loss of the second network, and the regression loss and the RPN loss of the second network are determined based on a ground truth label of a region proposal in the target image and a predicted value predicted by the second network for the region proposal in the target image.

In a possible implementation, the obtaining unit is specifically configured to:
receive the target network sent by a model training device, where the model training device is configured to perform training to obtain the target network.

It should be noted that, for implementations and beneficial effect of the units, refer to corresponding description in the method embodiment shown in FIG. 10.

Figure 16:
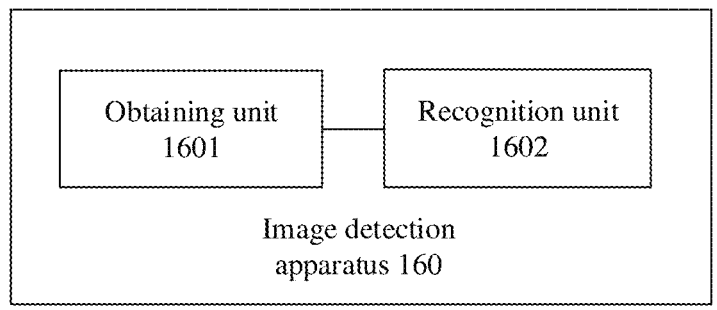
FIG. 16 is a schematic diagram of a structure of still another image detection apparatus according to an embodiment of this application.

FIG. 16 is a schematic diagram of a structure of an image detection apparatus 160 according to an embodiment of this application. The image detection apparatus 160 may be the model using device in the foregoing method embodiment or a component in the model using device. The image detection apparatus 160 may include an obtaining unit 1601 and a recognition unit 1602. Detailed description of the units is as follows.

The obtaining unit 1601 is configured to obtain a target network, where the target network is a network obtained by training a second network through iteration by using a plurality of networks, all the plurality of networks are classification networks, the plurality of networks include at least a first network and a third network, and the third network is used to train an intermediate network after the second network is trained by using the first network to obtain the intermediate network, where a depth of the third network is greater than a depth of the first network, and a depth of the first network is greater than a depth of the second network.

The recognition unit 1602 is configured to recognize content in an image by using the target network.

In the foregoing method, after the second network is trained by using the first network, the third network with more layers is further used to further train the trained second network, so that performance of the second network can be stably improved.

In a possible implementation, a parameter used when the second network is trained by using the first network includes a feature loss, the feature loss is determined based on a first local feature and a second local feature, the first local feature is a feature that is extracted from first feature information by using a Gaussian mask and that is about a target object, the second local feature is a feature that is extracted from second feature information by using the Gaussian mask and that is about the target object, the first feature information is feature information that is extracted by using a feature extraction layer of the first network and that is in a target image, and the second feature information is feature information that is extracted by using a feature extraction layer of the second network and that is in the target image.

In this possible implementation, the Gaussian mask is used to highlight the local feature that is in the feature information extracted by the first network and that is about the target object, and highlight the local feature that is in the feature information extracted by the second network and that is about the target object. Then, the feature loss is determined based on the local features that are in the two networks and that are about the target object, and the second network is subsequently trained based on the feature loss. Background noise (including background noise outside a viewfinder frame of the target object and background noise inside the viewfinder frame of the target object) of the image is filtered out by using the Gaussian mask. The resulting feature loss can better reflect a difference between the second network and the first network. Therefore, training the second network based on the feature loss can enable expression of a feature by the second network to approximate expression of a feature by the first network, and model distillation effect is good.

In a possible implementation, the parameter used when the second network is trained by using the first network includes a classification loss, the classification loss is determined based on a first classification predicted value and a second classification predicted value, the first classification predicted value is a classification predicted value that is generated by using a classification layer of the first network and that is of a target region proposal in a region proposal set, and the second classification predicted value is a classification predicted value that is generated by using a classification layer of the second network and that is of the target region proposal in the region proposal set.

In this possible implementation, the same region proposal set is selected, so that the classification layer of the first network and the classification layer of the second network generate the classification predicted values based on the same region proposal. When region proposals are the same, a difference between the predicted values generated by the two networks is usually caused by a difference between model parameters of the two networks. Therefore, in this embodiment, the classification loss used to train the second network is determined based on a difference between the first predicted value and the second predicted value. In this manner, a loss of the second network relative to the first network can be minimized. Therefore, training the second model based on the classification loss can enable a classification result of the second network to approximate a classification result of the first network, and the model distillation effect is good.

In a possible implementation, both the first network and the second network have the region proposal set by sharing a region proposal network (RPN) between the first network and the second network.

In a possible implementation, the RPN is shared by the second network with the first network, or is shared by the first network with the second network.

In a possible implementation, the target region proposal is all region proposals in the region proposal set, or is a positive region proposal that is in the region proposal set and that belongs to the target object.

In a possible implementation, the classification loss $L_{cls}$ meets the following relationship:

$$L_{cls} = \sum_{m=1}^{K} L_{CE}(y_s^m, y^m) + \beta \sum_{n=1}^{N_p} L_{BCE}(y_s^n, y_t^n).$$

K is a total quantity of region proposals in the region proposal set, $N_p$ is a total quantity of positive region proposals that are in the region proposal set and that belong to the target object, $y_s^m$ is a classification predicted value predicted by the classification layer of the second network for an $m^{th}$ region proposal in the region proposal set, $y^m$ is a ground truth label corresponding to the $m^{th}$ region proposal in the region proposal set, $y_s^n$ is the second classification predicted value predicted by the classification layer of the second network for an $n^{th}$ positive region proposal that is in the region proposal set and that belongs to the target object, $y_t^n$ is the first classification predicted value predicted by the classification layer of the first network for the $n^{th}$ positive region proposal that is in the region proposal set and that belongs to the target object, $L_{CE}(y_s^m, y^m)$ represents a cross entropy loss obtained based on $y_s^m$ and $y^m$, $L_{BCE}(y_s^n, y_t^n)$ represents a binary cross entropy loss obtained based on $y_s^n$ and $y_t^n$, and $\beta$ is a preset weight balance factor.

In a possible implementation, the parameter used for training the second network further includes a regression loss and an RPN loss of the second network, and the regression loss and the RPN loss of the second network are determined based on a ground truth label of a region proposal in the target image and a predicted value predicted by the second network for the region proposal in the target image.

In a possible implementation, the obtaining unit is specifically configured to:
receive the target network sent by a model training device, where the model training device is configured to perform training to obtain the target network.

It should be noted that, for implementations and beneficial effect of the units, refer to corresponding description in the method embodiment shown in FIG. 10.

Figure 17:
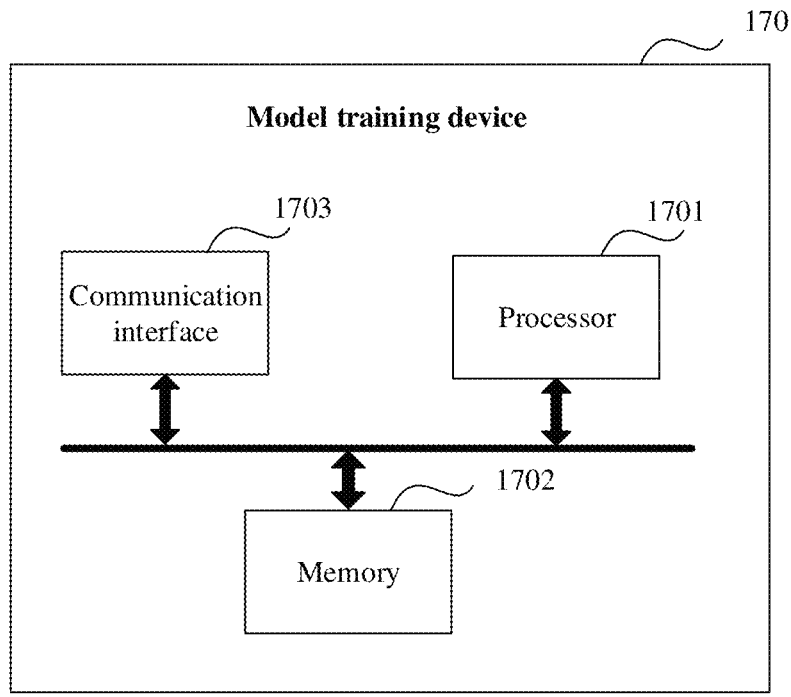
FIG. 17 is a schematic diagram of a structure of a model training device according to an embodiment of this application.

FIG. 17 is a schematic diagram of a structure of a model training device 170 according to an embodiment of this application. The model training device 170 includes a processor 1701, a memory 1702, and a communication interface 1703. The processor 1701, the memory 1702, and the communication interface 1703 are connected to each other through a bus.

The memory 1702 includes, but is not limited to, a random access memory (RAM), a read-only memory (ROM), an erasable programmable read-only memory (EPROM), or a compact disc read-only memory (CD-ROM). The memory 1702 is configured to store related computer programs and data. The communication interface 1703 is configured to receive and send data.

The processor 1701 may be one or more central processing units (CPU). When the processor 1701 is a CPU, the CPU may be a single-core CPU or a multi-core CPU.

The processor 1701 in the model training device 170 is configured to read computer program code stored in the memory 1702, to perform the following operations:
extracting first feature information in a target image by using a feature extraction layer of a first network;
extracting second feature information in the target image by using a feature extraction layer of a second network;
extracting a feature that is in the first feature information and that is about a target object by using a Gaussian mask to obtain a first local feature;
extracting a feature that is in the second feature information and that is about the target object by using the Gaussian mask to obtain a second local feature;
determining a feature loss by using the first local feature and the second local feature; and training the second network based on the feature loss to obtain a target network.

In the foregoing method, the Gaussian mask is used to highlight the local feature that is in the feature information extracted by the first network and that is about the target object, and highlight the local feature that is in the feature information extracted by the second network and that is about the target object. Then, the feature loss is determined based on the local features that are in the two networks and that are about the target object, and the second network is subsequently trained based on the feature loss. Background noise (including background noise outside a viewfinder frame of the target object and background noise inside the viewfinder frame of the target object) of the image is filtered out by using the Gaussian mask. The resulting feature loss can better reflect a difference between the second network and the first network. Therefore, training the second network based on the feature loss can enable expression of a feature by the second network to approximate expression of a feature by the first network, and model distillation effect is good.

In a possible implementation, the processor is further configured to:
generate a first classification predicted value of a target region proposal in a region proposal set by using a classification layer of the first network;
generate a second classification predicted value of the target region proposal in the region proposal set by using a classification layer of the second network; and
determine a classification loss based on the first classification predicted value and the second classification predicted value.

The training the second network based on the feature loss to obtain a target network includes:
training the second network based on the feature loss and the classification loss to obtain the target network.

In this possible implementation, the same region proposal set is selected, so that the classification layer of the first network and the classification layer of the second network generate the classification predicted values based on the same region proposal. When region proposals are the same, a difference between the predicted values generated by the two networks is usually caused by a difference between model parameters of the two networks. Therefore, in this embodiment, the classification loss used to train the second network is determined based on a difference between the first predicted value and the second predicted value. In this manner, a loss of the second network relative to the first network can be minimized. Therefore, training the second model based on the classification loss can enable a classification result of the second network to approximate a classification result of the first network, and the model distillation effect is good.

In a possible implementation, when training the second network based on the feature loss to obtain the target network, the processor is specifically configured to:

train the second network based on the feature loss; and
train the trained second network by using a third network to obtain the target network, where a depth of the third network is greater than the depth of the first network.

In this possible implementation, after the second network is trained by using the first network, the third network with more layers is further used to further train the trained second network, so that performance of the second network can be stably improved.

In a possible implementation, both the first network and the second network have the region proposal set by sharing a region proposal network (RPN) between the first network and the second network.

In a possible implementation, the RPN is shared by the second network with the first network, or is shared by the first network with the second network.

In a possible implementation, the target region proposal is all region proposals in the region proposal set, or is a positive region proposal that is in the region proposal set and that belongs to the target object.

In a possible implementation, the classification loss $L_{cls}$ meets the following relationship:

$$L_{cls} = \sum_{m=1}^{K} L_{CE}(y_s^m, y^m) + \beta \sum_{n=1}^{N_p} L_{BCE}(y_s^n, y_t^n).$$

K is a total quantity of region proposals in the region proposal set, $N_p$ is a total quantity of positive region proposals that are in the region proposal set and that belong to the target object, $y_s^m$ is a classification predicted value predicted by the classification layer of the second network for an $m^{th}$ region proposal in the region proposal set, $y^m$ is a ground truth label corresponding to the $m^{th}$ region proposal in the region proposal set, $y_s^n$ is the second classification predicted value predicted by the classification layer of the second network for an $n^{th}$ positive region proposal that is in the region proposal set and that belongs to the target object, $y_t^n$ is the first classification predicted value predicted by the classification layer of the first network for the $n^{th}$ positive region proposal that is in the region proposal set and that belongs to the target object, $L_{CE}(y_s^m, y^m)$ represents a cross entropy loss obtained based on $y_s^m$ and $y^m$, $L_{BCE}(y_s^n, y_t^n)$ represents a binary cross entropy loss obtained based on $y_s^n$ and $y_t^n$, and $\beta$ is a preset weight balance factor.

In a possible implementation, the processor is further configured to:
determine a regression loss and an RPN loss of the second network based on a ground truth label of a region proposal in the target image and a predicted value predicted by the second network for the region proposal in the target image.

The training the second network based on the feature loss and the classification loss to obtain the target network includes:
training the second network based on the feature loss, the classification loss, the regression loss, and the RPN loss to obtain the target network.

In a possible implementation, after the training the second network based on the feature loss to obtain the target network, the processor is further configured to:
send the target network to a model using device through the communication interface 1703, where the target network is used to predict content in an image.

It should be noted that, for implementations of the operations, refer to the corresponding description in the method embodiment shown in FIG. 10.

Figure 18:
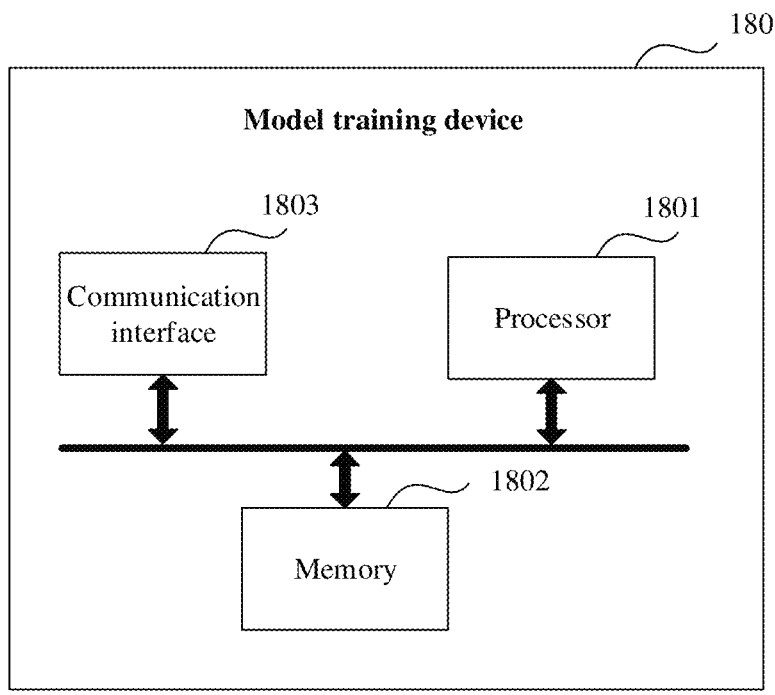
FIG. 18 is a schematic diagram of a structure of still another model training device according to an embodiment of this application.

FIG. 18 is a schematic diagram of a structure of a model training device 180 according to an embodiment of this application. The model training device 180 includes a processor 1801, a memory 1802, and a communication interface 1803. The processor 1801, the memory 1802, and the communication interface 1803 are connected to each other through a bus.

The memory 1802 includes, but is not limited to, a random access memory (random access memory, RAM), a read-only memory (read-only memory, ROM), an erasable programmable read-only memory (erasable programmable read only memory, EPROM), or a compact disc read-only memory (compact disc read-only memory, CD-ROM). The memory 1802 is configured to store related computer programs and data. The communication interface 1803 is configured to receive and send data.

The processor 1801 may be one or more central processing units (central processing unit, CPU). When the processor 1801 is a CPU, the CPU may be a single-core CPU or a multi-core CPU.

The processor 1801 in the model training device 180 is configured to read computer program code stored in the memory 1802, to perform the following operations:
training a second network based on a first network to obtain an intermediate network, where in embodiments of this application, training the second network based on the first network is essentially distilling the second network by using the first network, and training, based on a third network, the second network that has been trained by the first network is essentially distilling the second network that has been distilled by the first network by using the third network, which is generally described herein; and
training the intermediate network based on the third network to obtain a target network, where all the first network, the second network, and the third network are classification networks, a depth of the third network is greater than a depth of the first network, and the depth of the first network is greater than a depth of the second network.

In the foregoing method, after the second network is trained by using the first network, the third network with more layers is further used to further train the trained second network, so that performance of the second network can be stably improved.

In a possible implementation, when training the second network based on the first network to obtain the intermediate network, the processor is specifically configured to:
extract first feature information in a target image by using a feature extraction layer of the first network;
extract second feature information in the target image by using a feature extraction layer of the second network;
extract a feature that is in the first feature information and that is about a target object by using a Gaussian mask to obtain a first local feature;
extract a feature that is in the second feature information and that is about the target object by using the Gaussian mask to obtain a second local feature;
determine a feature loss by using the first local feature and the second local feature; and
train the second network based on the feature loss to obtain the intermediate network.

In this possible implementation, the Gaussian mask is used to highlight the local feature that is in the feature information extracted by the first network and that is about the target object, and highlight the local feature that is in the feature information extracted by the second network and that is about the target object. Then, the feature loss is determined based on the local features that are in the two networks and that are about the target object, and the second network is subsequently trained based on the feature loss. Background noise (including background noise outside a viewfinder frame of the target object and background noise inside the viewfinder frame of the target object) of the image is filtered out by using the Gaussian mask. The resulting feature loss can better reflect a difference between the second network and the first network. Therefore, training the second network based on the feature loss can enable expression of a feature by the second network to approximate expression of a feature by the first network, and model distillation effect is good.

In a possible implementation, the processor 1801 is further configured to:

generate a first classification predicted value of a target region proposal in a region proposal set by using a classification layer of the first network;

generate a second classification predicted value of the target region proposal in the region proposal set by using a classification layer of the second network; and determine a classification loss based on the first classification predicted value and the second classification predicted value.

When training the second network based on the feature loss to obtain the intermediate network, the processor is specifically configured to:

train the second network based on the feature loss and the classification loss to obtain the intermediate network.

In this possible implementation, the same region proposal set is selected, so that the classification layer of the first network and the classification layer of the second network generate the classification predicted values based on the same region proposal. When region proposals are the same, a difference between the predicted values generated by the two networks is usually caused by a difference between model parameters of the two networks. Therefore, in this embodiment, the classification loss used to train the second network is determined based on a difference between the first predicted value and the second predicted value. In this manner, a loss of the second network relative to the first network can be minimized. Therefore, training the second model based on the classification loss can enable a classification result of the second network to approximate a classification result of the first network, and the model distillation effect is good.

In a possible implementation, both the first network and the second network have the region proposal set by sharing a region proposal network (RPN) between the first network and the second network.

In a possible implementation, the RPN is shared by the second network with the first network, or is shared by the first network with the second network.

In a possible implementation, the target region proposal is all region proposals in the region proposal set, or is a positive region proposal that is in the region proposal set and that belongs to the target object.

In a possible implementation, the classification loss $L_{cls}$ meets the following relationship:

$$L_{cls} = \sum_{m=1}^{K} L_{CE}(y_s^m, y^m) + \beta \sum_{n=1}^{N_p} L_{BCE}(y_s^n, y_t^n).$$

K is a total quantity of region proposals in the region proposal set, $N_p$ is a total quantity of positive region proposals that are in the region proposal set and that belong to the target object, $y_s^m$ is a classification predicted value predicted by the classification layer of the second network for an $m^{th}$ region proposal in the region proposal set, $y^m$ is a ground truth label corresponding to the $m^{th}$ region proposal in the region proposal set, $y_s^n$ is the second classification predicted value predicted by the classification layer of the second network for an $n^{th}$ positive region proposal that is in the region proposal set and that belongs to the target object, $y_t^n$ is the first classification predicted value predicted by the classification layer of the first network for the $n^{th}$ positive region proposal that is in the region proposal set and that belongs to the target object, $L_{CE}(y_s^m, y^m)$ represents a cross entropy loss obtained based on $y_s^m$ and $y^m$, $L_{BCE}(y_s^n, y_t^n)$ represents a binary cross entropy loss obtained based on $y_s^n$ and $y_t^n$, and $\beta$ is a preset weight balance factor.

In a possible implementation, the method further includes:

determining a regression loss and an RPN loss of the second network based on a ground truth label of a region proposal in the target image and a predicted value predicted by the second network for the region proposal in the target image.

The training the second network based on the feature loss and the classification loss to obtain the target network includes:

training the second network based on the feature loss, the classification loss, the regression loss, and the RPN loss to obtain the target network.

In a possible implementation, after the training the second network based on the feature loss to obtain the target network, the method further includes:

sending the target network to a model using device through the communication interface 1803, where the target network is used to predict content in an image.

It should be noted that, for implementations of the operations, refer to the corresponding description in the method embodiment shown in FIG. 10.

Figure 19:
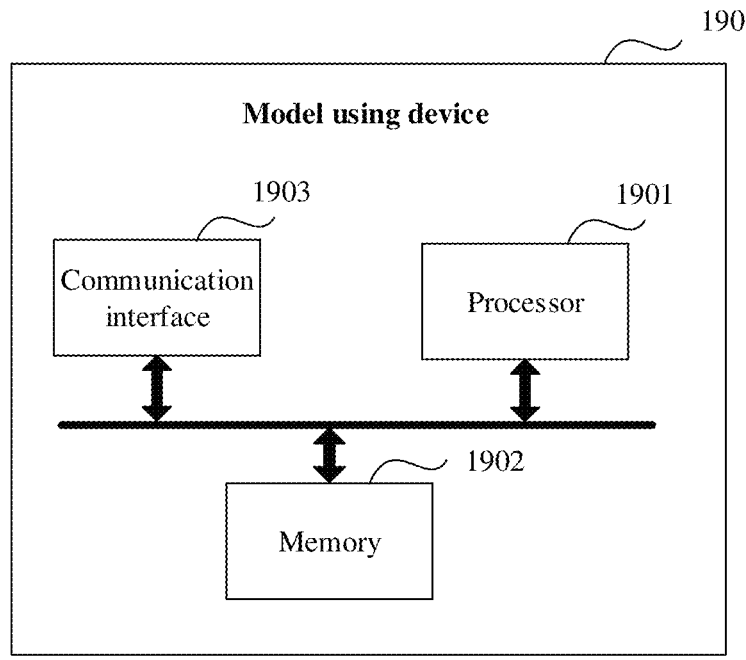
FIG. 19 is a schematic diagram of a structure of a model using device according to an embodiment of this application.

FIG. 19 is a schematic diagram of a structure of a model using device 190 according to an embodiment of this application. The model using device 190 may also be referred to as an image detection device or may have another name. The model using device 190 includes a processor 1901, a memory 1902, and a communication interface 1903. The processor 1901, the memory 1902, and the communication interface 1903 are connected to each other through a bus.

The memory 1902 includes, but is not limited to, a random access memory (RAM), a read-only memory (ROM), an erasable programmable read-only memory (EPROM), or a compact disc read-only memory (CD-ROM). The memory 1902 is configured to store related computer programs and data. The communication interface 1903 is configured to receive and send data.

The processor 1901 may be one or more central processing units (CPU). When the processor 1901 is a CPU, the CPU may be a single-core CPU or a multi-core CPU.

The processor 1901 in the model using device 190 is configured to read computer program code stored in the memory 1902, to perform the following operations:

obtaining a target network, where the target network is a network obtained after a second network is trained by using a first network, a parameter used for training the second network by using the first network includes a feature loss, the feature loss is determined based on a first local feature and a second local feature, the first local feature is a feature that is extracted from first feature information by using a Gaussian mask and that is about a target object, the second local feature is a feature that is extracted from second feature information by using the Gaussian mask and that is about the target object, the first feature information is feature information that is extracted by using a feature extraction layer of the first network and that is in a target image, the second feature information is feature information that is extracted by using a feature extraction layer of the second network and that is in the target image, both the first network and the second network are classification networks, and a depth of the first network is greater than a depth of the second network; and recognizing content in an image by using the target network.

In the foregoing method, the Gaussian mask is used to highlight the local feature that is in the feature information extracted by the first network and that is about the target object, and highlight the local feature that is in the feature information extracted by the second network and that is about the target object. Then, the feature loss is determined based on the local features that are in the two networks and that are about the target object, and the second network is subsequently trained based on the feature loss. Background noise (including background noise outside a viewfinder frame of the target object and background noise inside the viewfinder frame of the target object) of the image is filtered out by using the Gaussian mask. The resulting feature loss can better reflect a difference between the second network and the first network. Therefore, training the second network based on the feature loss can enable expression of a feature by the second network to approximate expression of a feature by the first network, and model distillation effect is good.

In a possible implementation, the parameter used for training the second network further includes a classification loss, the classification loss is determined based on a first classification predicted value and a second classification predicted value, the first classification predicted value is a classification predicted value that is generated by using a classification layer of the first network and that is of a target region proposal in a region proposal set, and the second classification predicted value is a classification predicted value that is generated by using a classification layer of the second network and that is of the target region proposal in the region proposal set.

In this possible implementation, the same region proposal set is selected, so that the classification layer of the first network and the classification layer of the second network generate the classification predicted values based on the same region proposal. When region proposals are the same, a difference between the predicted values generated by the two networks is usually caused by a difference between model parameters of the two networks. Therefore, in this embodiment, the classification loss used to train the second network is determined based on a difference between the first predicted value and the second predicted value. In this manner, a loss of the second network relative to the first network can be minimized. Therefore, training the second model based on the classification loss can enable a classification result of the second network to approximate a classification result of the first network, and the model distillation effect is good.

In a possible implementation, the target network is specifically a network that is obtained after the second network is trained by using the first network and that is further trained by using a third network, and a depth of the third network is greater than the depth of the first network.

In this possible implementation, after the second network is trained by using the first network, the third network with more layers is further used to further train the trained second network, so that performance of the second network can be stably improved.

In a possible implementation, both the first network and the second network have the region proposal set by sharing a region proposal network (RPN) between the first network and the second network.

In a possible implementation, the RPN is shared by the second network with the first network, or is shared by the first network with the second network.

In a possible implementation, the target region proposal is all region proposals in the region proposal set, or is a positive region proposal that is in the region proposal set and that belongs to the target object.

In a possible implementation, the classification loss $L_{cls}$ meets the following relationship:

$$L_{cls} = \sum_{m=1}^{K} L_{CE}(y_s^m, y^m) + \beta \sum_{n=1}^{N_p} L_{BCE}(y_s^n, y_t^n).$$

K is a total quantity of region proposals in the region proposal set, $N_p$ is a total quantity of positive region proposals that are in the region proposal set and that belong to the target object, $y_s^m$ is a classification predicted value predicted by the classification layer of the second network for an $m^{th}$ region proposal in the region proposal set, $y^m$ is a ground truth label corresponding to the $m^{th}$ region proposal in the region proposal set, $y_s^n$ is the second classification predicted value predicted by the classification layer of the second network for an $n^{th}$ positive region proposal that is in the region proposal set and that belongs to the target object, $y_t^n$ is the first classification predicted value predicted by the classification layer of the first network for the $n^{th}$ positive region proposal that is in the region proposal set and that belongs to the target object, $L_{CE}(y_s^m, y^m)$ represents a cross entropy loss obtained based on $y_s^m$ and $y^m$, $L_{BCE}(y_s^n, y_t^n)$ represents a binary cross entropy loss obtained based on $y_s^n$ and $y_t^n$, and $\beta$ is a preset weight balance factor.

In a possible implementation, the parameter used for training the second network further includes a regression loss and an RPN loss of the second network, and the regression loss and the RPN loss of the second network are determined based on a ground truth label of a region proposal in the target image and a predicted value predicted by the second network for the region proposal in the target image.

In a possible implementation, when obtaining the target network, the processor is further configured to:

receive the target network sent by a model training device through the communication interface 1903, where the model training device is configured to perform training to obtain the target network.

It should be noted that, for implementations of the operations, refer to the corresponding description in the method embodiment shown in FIG. 10.

Figure 20:
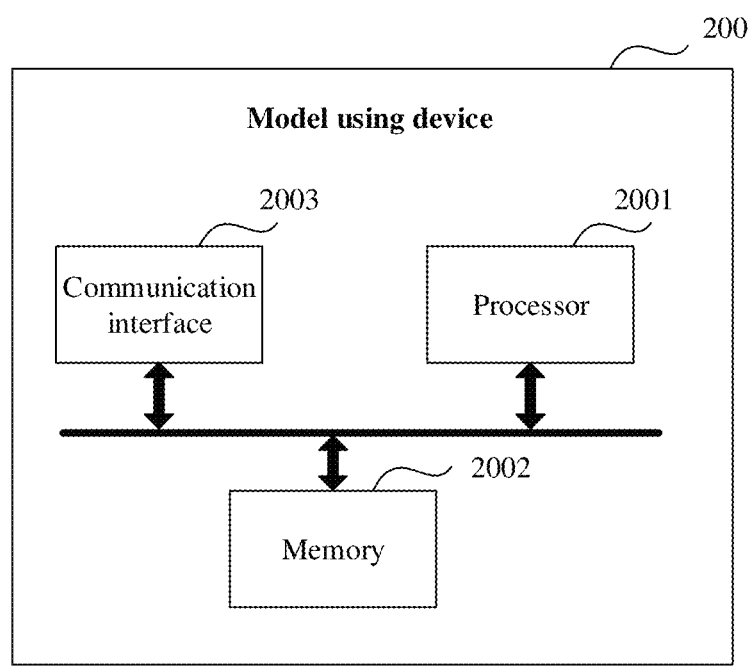
FIG. 20 is a schematic diagram of a structure of still another model using device according to an embodiment of this application.

FIG. 20 is a schematic diagram of a structure of a model using device 200 according to an embodiment of this application. The model using device 200 may also be referred to as an image detection device or may have another name. The model using device 200 includes a processor 2001, a memory 2002, and a communication interface 2003.

The processor 2001, the memory 2002, and the communication interface 2003 are connected to each other through a bus.

The memory 2002 includes, but is not limited to, a random access memory (RAM), a read-only memory (ROM), an erasable programmable read-only memory (EPROM), or a compact disc read-only memory (CD-ROM). The memory 2002 is configured to store related computer programs and data. The communication interface 2003 is configured to receive and send data.

The processor 2001 may be one or more central processing units (CPU). When the processor 2001 is a CPU, the CPU may be a single-core CPU or a multi-core CPU.

The processor 2001 in the model using device 200 is configured to read computer program code stored in the memory 2002, to perform the following operations:

obtaining a target network, where the target network is a network obtained by training a second network through iteration by using a plurality of networks, all the plurality of networks are classification networks, the plurality of networks include at least a first network and a third network, and the third network is used to train an intermediate network after the second network is trained by using the first network to obtain the intermediate network, where a depth of the third network is greater than a depth of the first network, and a depth of the first network is greater than a depth of the second network; and recognizing content in an image by using the target network.

In the foregoing method, after the second network is trained by using the first network, the third network with more layers is further used to further train the trained second network, so that performance of the second network can be stably improved.

In a possible implementation, a parameter used when the second network is trained by using the first network includes a feature loss, the feature loss is determined based on a first local feature and a second local feature, the first local feature is a feature that is extracted from first feature information by using a Gaussian mask and that is about a target object, the second local feature is a feature that is extracted from second feature information by using the Gaussian mask and that is about the target object, the first feature information is feature information that is extracted by using a feature extraction layer of the first network and that is in a target image, and the second feature information is feature information that is extracted by using a feature extraction layer of the second network and that is in the target image.

In this possible implementation, the Gaussian mask is used to highlight the local feature that is in the feature information extracted by the first network and that is about the target object, and highlight the local feature that is in the feature information extracted by the second network and that is about the target object. Then, the feature loss is determined based on the local features that are in the two networks and that are about the target object, and the second network is subsequently trained based on the feature loss. Background noise (including background noise outside a viewfinder frame of the target object and background noise inside the viewfinder frame of the target object) of the image is filtered out by using the Gaussian mask. The resulting feature loss can better reflect a difference between the second network and the first network. Therefore, training the second network based on the feature loss can enable expression of a feature by the second network to approximate expression of a feature by the first network, and model distillation effect is good.

In a possible implementation, the parameter used when the second network is trained by using the first network includes a classification loss, the classification loss is determined based on a first classification predicted value and a second classification predicted value, the first classification predicted value is a classification predicted value that is generated by using a classification layer of the first network and that is of a target region proposal in a region proposal set, and the second classification predicted value is a classification predicted value that is generated by using a classification layer of the second network and that is of the target region proposal in the region proposal set.

In this possible implementation, the same region proposal set is selected, so that the classification layer of the first network and the classification layer of the second network generate the classification predicted values based on the same region proposal. When region proposals are the same, a difference between the predicted values generated by the two networks is usually caused by a difference between model parameters of the two networks. Therefore, in this embodiment, the classification loss used to train the second network is determined based on a difference between the first predicted value and the second predicted value. In this manner, a loss of the second network relative to the first network can be minimized. Therefore, training the second model based on the classification loss can enable a classification result of the second network to approximate a classification result of the first network, and the model distillation effect is good.

In a possible implementation, both the first network and the second network have the region proposal set by sharing a region proposal network RPN between the first network and the second network.

In a possible implementation, the RPN is shared by the second network with the first network, or is shared by the first network with the second network.

In a possible implementation, the target region proposal is all region proposals in the region proposal set, or is a positive region proposal that is in the region proposal set and that belongs to the target object.

In a possible implementation, the classification loss $L_{cls}$ meets the following relationship:

$$L_{cls} = \sum_{m=1}^{K} L_{CE}(y_s^m, y^m) + \beta \sum_{n=1}^{N_p} L_{BCE}(y_s^n, y_t^n).$$

K is a total quantity of region proposals in the region proposal set, $N_p$ is a total quantity of positive region proposals that are in the region proposal set and that belong to the target object, $y_s^m$ is a classification predicted value predicted by the classification layer of the second network for an $m^{th}$ region proposal in the region proposal set, $y^m$ is a ground truth label corresponding to the $m^{th}$ region proposal in the region proposal set, $y_s^n$ is the second classification predicted value predicted by the classification layer of the second network for an $n^{th}$ positive region proposal that is in the region proposal set and that belongs to the target object, $y_t^n$ is the first classification predicted value predicted by the classification layer of the first network for the $n^{th}$ positive region proposal that is in the region proposal set and that belongs to the target object, $L_{CE}(y_s^m, y^m)$ represents a cross entropy loss obtained based on $y_s^m$ and $y^m$, $L_{BCE}(y_s^n, y_t^n)$ represents a binary cross entropy loss obtained based on $y_s^n$ and $y_t^n$, and β is a preset weight balance factor.

In a possible implementation, the parameter used for training the second network further includes a regression loss and an RPN loss of the second network, and the regression loss and the RPN loss of the second network are determined based on a ground truth label of a region proposal in the target image and a predicted value predicted by the second network for the region proposal in the target image.

In a possible implementation, the obtaining a target network includes:

receiving the target network sent by a model training device, where the model training device is configured to perform training to obtain the target network.

It should be noted that, for implementations of the operations, refer to the corresponding description in the method embodiment shown in FIG. 10.

An embodiment of this application further provides a chip system, where the chip system includes at least one processor, a memory, and an interface circuit. The memory, the transceiver, and the at least one processor are interconnected through a line. The at least one memory stores a computer program. When the computer program is executed by the processor, the method procedure shown in FIG. 10 is implemented.

An embodiment of this application further provides a computer-readable storage medium. The computer-readable storage medium stores a computer program. When the computer program runs on a processor, the method procedure shown in FIG. 10 is implemented.

An embodiment of this application further provides a computer program product. When the computer program product is run on a processor, the method procedure shown in FIG. 10 is implemented.

A person of ordinary skill in the art may understand that all or some of the processes of the methods in the foregoing embodiments may be implemented by a computer program instructing related hardware. The computer program may be stored in a computer-readable storage medium. When the computer program is run, the processes in the foregoing method embodiments are performed. The foregoing storage medium includes: any medium that can store computer program code, such as a ROM, a random access memory (RAM), a magnetic disc, or an optical disc.

What is claimed is:

1. A model training method, comprising:
    extracting first feature information from a target image using a feature extraction layer of a first network;
    extracting second feature information from the target image using a feature extraction layer of a second network, wherein both the first network and the second network are classification networks, and a depth of the first network is greater than a depth of the second network;
    extracting a feature about a target object from the first feature information using a Gaussian mask to obtain a first local feature;
    extracting a feature about a target object from the second feature information using the Gaussian mask to obtain a second local feature;
    determining a feature loss using the first local feature and the second local feature; and
    training the second network based on the feature loss to obtain a target network.

2. The method according to claim 1, further comprising:
    generating a first classification predicted value of a target region proposal in a region proposal set using a classification layer of the first network;
    generating a second classification predicted value of the target region proposal in the region proposal set using a classification layer of the second network;
    determining a classification loss based on the first classification predicted value and the second classification predicted value; and
    the training the second network based on the feature loss to obtain a target network comprises:
    training the second network based on the feature loss and the classification loss to obtain the target network.

3. The method according to claim 2, wherein both the first network and the second network have the region proposal set by sharing a region proposal network (RPN) between the first network and the second network.

4. The method according to claim 3, wherein the RPN is shared by the second network with the first network, or is shared by the first network with the second network.

5. The method according to claim 2, wherein the target region proposal is all region proposals in the region proposal set, or is a positive region proposal that is in the region proposal set and that belongs to the target object.

6. The method according to claim 2, wherein the classification loss $L_{cls}$ satisfies the following relationship:

$$L_{cls} = \sum_{m=1}^{K} L_{CE}(y_s^m, y^m) + \beta \sum_{n=1}^{N_p} L_{BCE}(y_s^n, y_t^n),$$

K is a total quantity of region proposals in the region proposal set, $N_p$ is a total quantity of positive region proposals that are in the region proposal set and that belong to the target object, $y_s^m$ is a classification predicted value predicted by the classification layer of the second network for an $m^{th}$ region proposal in the region proposal set, $y^m$ is a ground truth label corresponding to the $m^{th}$ region proposal in the region proposal set, $y_s^n$ is the second classification predicted value predicted by the classification layer of the second network for an $n^{th}$ positive region proposal that is in the region proposal set and that belongs to the target object, $y_t^n$ is the first classification predicted value predicted by the classification layer of the first network for the $n^{th}$ positive region proposal that is in the region proposal set and that belongs to the target object, $L_{CE}(y_s^m, y^m)$ represents a cross entropy loss obtained based on $y_s^m$ and $y^m$, $L_{BCE}(y_s^n, y_t^n)$ represents a binary cross entropy loss obtained based on $y_s^n$ and $y_t^n$, and β is a preset weight balance factor.

7. The method according to claim 2, further comprising:
    determining a regression loss and an RPN loss of the second network based on a ground truth label of a region proposal in the target image and a predicted value predicted by the second network for the region proposal in the target image; and
    the training the second network based on the feature loss and the classification loss to obtain the target network comprises:
    training the second network based on the feature loss, the classification loss, the regression loss, and the RPN loss to obtain the target network.

8. The method according to claim 1, wherein the training the second network based on the feature loss to obtain a target network comprises:

training the second network based on the feature loss to obtain a trained second network; and
training the trained second network using a third network to obtain the target network, wherein a depth of the third network is greater than the depth of the first network.

9. The method according to claim 1, after the training the second network based on the feature loss to obtain a target network, the method further comprises:
sending the target network to a model using device, wherein content in an image is predicted using the target network.

10. An image detection apparatus, comprising at least one processor and a memory storage instructions that, when executed by the at least one processor, cause the image detection apparatus to:
obtain a target network, wherein the target network is obtained after a second network is trained using a first network, a parameter used for training the second network using the first network comprises a feature loss, the feature loss is determined based on a first local feature and a second local feature, the first local feature is extracted from first feature information using a Gaussian mask and is about a target object, the second local feature is extracted from second feature information using the Gaussian mask and is about the target object, the first feature information is extracted from a target image using a feature extraction layer of the first network, the second feature information is extracted from the target image using a feature extraction layer of the second network, both the first network and the second network are classification networks, and a depth of the first network is greater than a depth of the second network; and
recognize content in an image using the target network.

11. The apparatus according to claim 10, wherein the parameter used for training the second network further comprises a classification loss, the classification loss is determined based on a first classification predicted value and a second classification predicted value, the first classification predicted value is a classification predicted value that is generated using a classification layer of the first network and that is of a target region proposal in a region proposal set, and the second classification predicted value is a classification predicted value that is generated using a classification layer of the second network and that is of the target region proposal in the region proposal set.

12. The apparatus according to claim 11, wherein both the first network and the second network have the region proposal set by sharing a region proposal network (RPN) between the first network and the second network.

13. The apparatus according to claim 12, wherein the RPN is shared by the second network with the first network, or is shared by the first network with the second network.

14. The apparatus according to claim 11, wherein the target region proposal is all region proposals in the region proposal set, or is a positive region proposal that is in the region proposal set and that belongs to the target object.

15. The apparatus according to claim 11, wherein the classification loss $L_{cls}$ satisfies the following relationship:

$$L_{cls} = \sum_{m=1}^{K} L_{CE}(y_s^m, y^m) + \beta \sum_{n=1}^{N_p} L_{BCE}(y_s^n, y_t^n),$$

wherein
K is a total quantity of region proposals in the region proposal set, $N_p$ is a total quantity of positive region proposals that are in the region proposal set and that belong to the target object, $y_s^m$ is a classification predicted value predicted by the classification layer of the second network for an $m^{th}$ region proposal in the region proposal set, $y^m$ is a ground truth label corresponding to the $m^{th}$ region proposal in the region proposal set, $y_s^n$ is the second classification predicted value predicted by the classification layer of the second network for an $n^{th}$ positive region proposal that is in the region proposal set and that belongs to the target object, $y_t^n$ is the first classification predicted value predicted by the classification layer of the first network for the $n^{th}$ positive region proposal that is in the region proposal set and that belongs to the target object, $L_{CE}(y_s^m, y^m)$ represents a cross entropy loss obtained based on $y_s^m$ and $y^m$, $L_{BCE}(y_s^n, y_t^n)$ represents a binary cross entropy loss obtained based on $y_s^n$ and $y_t^n$, and β is a preset weight balance factor.

16. The apparatus according to claim 11, wherein
the parameter used for training the second network further comprises a regression loss and an RPN loss of the second network, and the regression loss and the RPN loss of the second network are determined based on a ground truth label of a region proposal in the target image and a predicted value predicted by the second network for the region proposal in the target image.

17. The apparatus according to claim 10, wherein the target network is obtained by training the second network using the first network to obtain a trained second network and then training the trained second network using a third network, and a depth of the third network is greater than the depth of the first network.

18. The apparatus according to claim 10, wherein the instructions, when executed by the at least one processor, further cause the apparatus to:
receive the target network sent by a model training device, wherein the model training device is configured to perform training to obtain the target network.

19. A computer-readable storage medium, configured to store a computer program including instructions that, when executed by at least one processor, cause the at least one processor to perform operations comprising:
extracting first feature information from a target image using a feature extraction layer of a first network;
extracting second feature information from the target image using a feature extraction layer of a second network, wherein both the first network and the second network are classification networks, and a depth of the first network is greater than the depth of the second network;
extracting a feature about a target object from the first feature information using a Gaussain mask to obtain a first local feature;
extracting a feature about the target object from the second feature information using the Gaussain mask to obtain a second local feature;
determining a feature loss using the first local feature and the second local feature; and
training the second network based on the feature loss to obtain a target network.

* * * * *

UNITED STATES PATENT AND TRADEMARK OFFICE
CERTIFICATE OF CORRECTION

PATENT NO. : 12,380,680 B2  
APPLICATION NO. : 17/986081  
DATED : August 5, 2025  
INVENTOR(S) : Fuhui Tang et al.

Page 1 of 1

It is certified that error appears in the above-identified patent and that said Letters Patent is hereby corrected as shown below:

In the Claims

Column 49, Claim 1, Line 61, change "a target" to -- the target --; and

Column 51, Claim 10, Line 14, change "memory storage" to -- memory storing --.

Signed and Sealed this  
Second Day of September, 2025

Coke Morgan Stewart  
*Acting Director of the United States Patent and Trademark Office*